(12) United States Patent
Gupta

(10) Patent No.: US 10,946,762 B2
(45) Date of Patent: Mar. 16, 2021

(54) SYSTEM, APPARATUS AND METHODS OF ELECTRICITY GENERATION TO END-USE FOR FAST CHARGING OF ELECTRIC VEHICLE

(71) Applicant: Ranjan Kumar Gupta, Bothell, WA (US)

(72) Inventor: Ranjan Kumar Gupta, Bothell, WA (US)

(73) Assignee: StorEdgeAI LLC, Bothell, WA (US)

( * ) Notice: Subject to any disclaimer, the term of this patent is extended or adjusted under 35 U.S.C. 154(b) by 355 days.

(21) Appl. No.: 15/911,092

(22) Filed: Mar. 3, 2018

(65) Prior Publication Data

US 2018/0264955 A1   Sep. 20, 2018

Related U.S. Application Data

(60) Provisional application No. 62/467,103, filed on Mar. 4, 2017.

(51) Int. Cl.
*H02J 7/00* (2006.01)
*B60L 58/12* (2019.01)
(Continued)

(52) U.S. Cl.
CPC ........... *B60L 58/12* (2019.02); *B60L 11/1811* (2013.01); *B60L 53/11* (2019.02); *B60L 53/20* (2019.02);
(Continued)

(58) Field of Classification Search
CPC ...... B60L 11/1811; B60L 53/20; B60L 58/12; B60L 53/51; B60L 53/11; B60L 53/52;
(Continued)

(56) References Cited

U.S. PATENT DOCUMENTS 9,193,277 B1   11/2015 Penilla
9,274,540 B2   3/2016 Anglin et al.
(Continued)

OTHER PUBLICATIONS

Sujie Shao et. al., "A Mobile Battery Swapping Service for Electric Vehicles Based on a Battery Swapping Van", Energies MDPI, Published: Oct. 20, 2017, Energies 2017, 10, 1667; doi:10.3390/en10101667; www.mdpi.com/journal/energies.

*Primary Examiner* — Zixuan Zhou
(74) *Attorney, Agent, or Firm* — Lieberman & Brandsdorfer, LLC

(57) ABSTRACT

A system for charging electric vehicles (EVs) includes at least one transportable battery-energy-storage DC systems (BESDCS), at least one renewable direct-current (DC) power supply station at a first location. The system also includes at least one DC charging station for charging of the at least one EV at a second location different from the first location. The system further includes at least one electric tanker transport comprising at least one electric truck vehicle configured to be coupled to the at least one BESDCS. The electric tanker transport is configured to transport the at least one BESDCS from the first location to the second location for charging of the at least one EV and transport the at least one BESDCS from the second location to the first location for charging the at least one BESDCS from renewable DC power supply station.

21 Claims, 27 Drawing Sheets

(51) Int. Cl.
  *B60L 11/18* (2006.01)
  *G06Q 30/02* (2012.01)
  *B60L 53/20* (2019.01)
  *B60L 53/51* (2019.01)
  *B60L 53/10* (2019.01)
  *B60L 53/52* (2019.01)

(52) U.S. Cl.
  CPC .............. *B60L 53/51* (2019.02); *B60L 53/52* (2019.02); *G06Q 30/0283* (2013.01); *B60L 2210/10* (2013.01); *B60L 2270/10* (2013.01); *Y04S 50/14* (2013.01)

(58) Field of Classification Search
  CPC ............ B60L 2270/10; B60L 2210/10; G06Q 30/0283; Y04S 50/14
  USPC ............................................ 320/109; 701/22
  See application file for complete search history.

(56) References Cited

U.S. PATENT DOCUMENTS

| | | | |
|---|---|---|---|
| 9,302,590 | B2 | 4/2016 | Santos Silva Serra Duarte |
| 9,321,361 | B2 | 4/2016 | Kamen et al. |
| 9,511,676 | B2 | 12/2016 | Loftus et al. |
| 9,555,715 | B2 | 1/2017 | Sugano |
| 9,592,742 | B1 | 3/2017 | Sosinov et al. |
| 9,627,921 | B2 | 4/2017 | Romeo |
| 9,846,918 | B2 | 12/2017 | Ortiz |
| 2009/0246596 | A1* | 10/2009 | Sridhar ................ B60L 53/305 320/101 |
| 2011/0204720 | A1* | 8/2011 | Ruiz ........................ H02J 3/14 307/66 |
| 2012/0299531 | A1* | 11/2012 | Prosser ................... B60L 50/66 320/104 |
| 2012/0313568 | A1* | 12/2012 | Paluszek ............... H02J 7/0027 320/101 |
| 2015/0343970 | A1 | 12/2015 | Choi et al. |
| 2016/0339788 | A1 | 11/2016 | Miftakhov |

\* cited by examiner

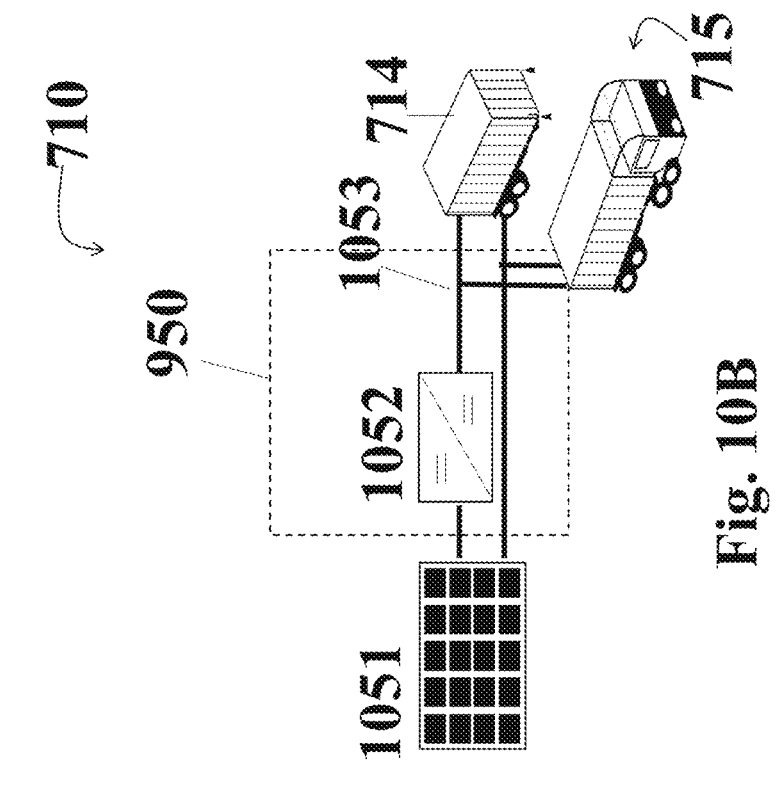
Fig. 10B
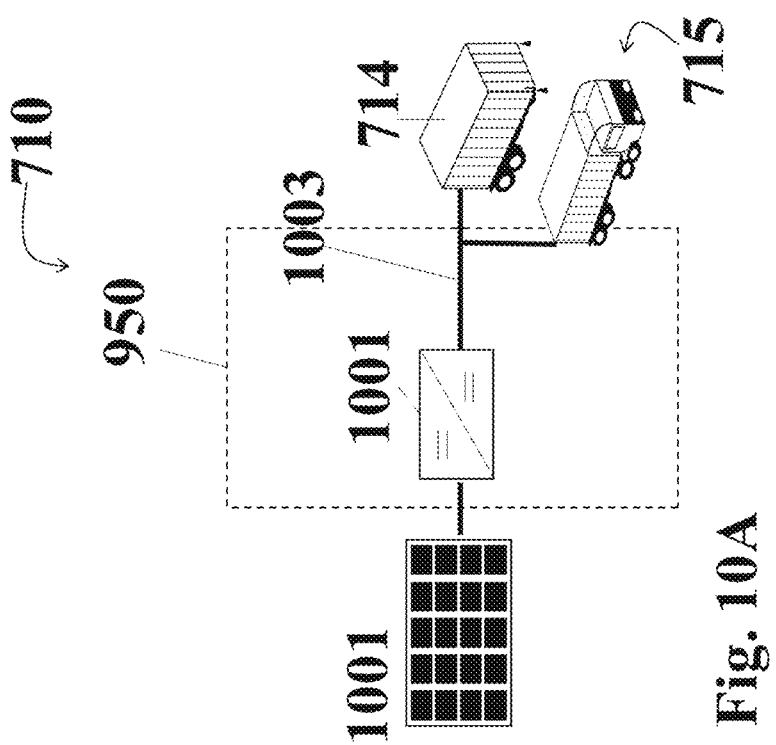
Fig. 10A
Fig. 10

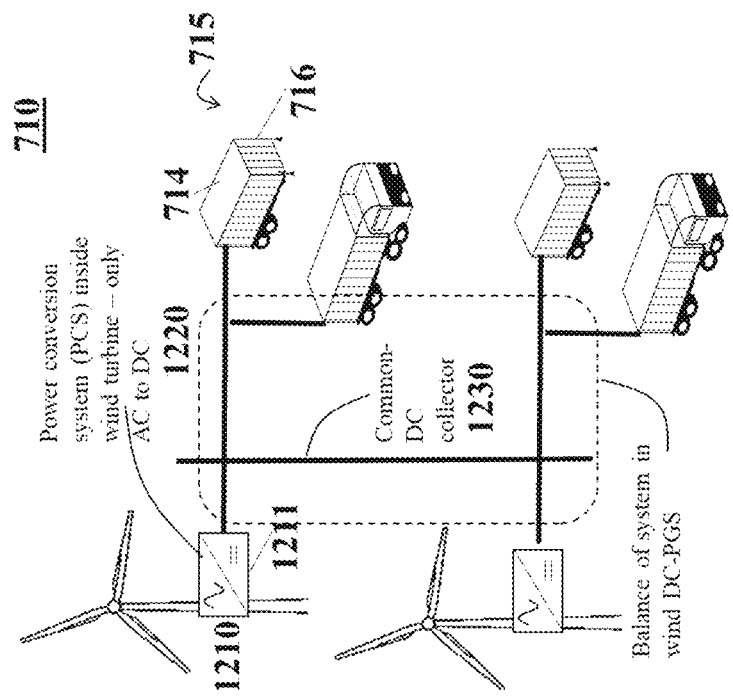
Fig. 12B
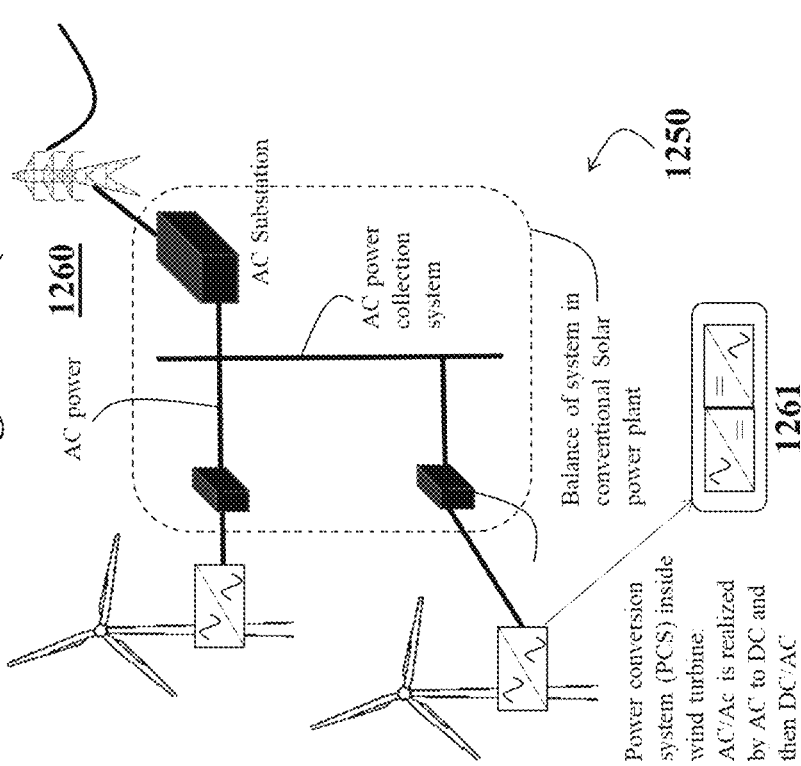
Fig. 12A (PRIOR ART)
Fig. 12

SYSTEM, APPARATUS AND METHODS OF ELECTRICITY GENERATION TO END-USE FOR FAST CHARGING OF ELECTRIC VEHICLE

CROSS-REFERENCE TO RELATED APPLICATION(S)

This application claims priority to provisional U.S. Patent Application No. 62/467,103, filed Mar. 4, 2017, titled "SYSTEM, APPARATUS AND METHODS OF ELECTRICITY GENERATION TO END-USE FOR FAST CHARGING OF ELECTRIC VEHICLE", which is hereby incorporated by reference.

FIELD OF THE INVENTION

The field of the invention relates generally to systems, apparatus and methods for battery-charging-infrastructure to enable wide-spread adoption of Electric Vehicles (EVs). More specifically, the embodiments described herein relates to systems, apparatus and methods to enable direct-current (DC) charging infrastructure for EVs analogous to gas-station infrastructure for gasoline vehicles.

BACKGROUND OF THE INVENTION

In United States, there are over 125,000 gas stations that provide fuel to more than 250 million gasoline vehicles. There is typically little to no customer anxiety over re-fueling gasoline vehicle since gas stations are conveniently located across the geography and re-fueling is performed in few minutes. Analogous to re-fueling a gas-tank of a gasoline vehicle, at a gas station, is re-charging battery of EVs, at EV charging-station. Therefore, wide-spread adoption of EV (i.e. hundreds of millions of EV on the road in future as compared to merely hundreds of thousands today in US, as an example) would require an EV charging-station infrastructure similar to that of the gas-station infrastructure of today to re-charge the EV battery in few minutes. Like gas stations, the charging stations will have to be conveniently located across the geography.

With the above future-requirement of EV charging stations in mind, let's look at the present status. At the residential level, battery charging devices for EV derives power from the power grid, or roof-top (photovoltaic) PV solar and/or stationary storage etc.; however, such charging device is far from sufficient due to long charging time (typically >4 hours) limited by peak power capacity of residential electric network, which limits the power rating of the charging device. At the commercial and industrial level, charging devices/stations, based on well-known Level 1, Level 2, or Level 3 (DC charging) charging technology, are located in places such as supermarkets, malls, corporate offices, etc. These charging devices/stations are great catalysts for faster adoption of EV; however, they are again far from the requirement of wide-spread adoption of EV, since all of them require 30 minutes or more to charge the battery to 80% of its peak capacity. Additionally, the charging stations based on direct current (DC) fast charging technology, Level 3, will likely require an extensive overhaul of electric power distribution networks (e.g., 12.47 kilovolts (kV) power grid) to which the DC fast charging stations are connected and draws power for charging (e.g., DC fast charging stations).

The overhaul of the distribution grid is primarily due to Level 3 charging stations. Specifically, to enable the wide-spread adoption of EV, the best-in-class Level 3 DC charging station with 150-kilowatt (kW) (peak charging power) capability can charge the EV battery from 10% to 80% of its peak capacity (100 kilowatt-hours (kWh)) in approximately 30 minutes. Research prototypes and demonstrators of future Level 3 DC charging stations are in the planning phase, with the peak capacity of 350 kW, enabling 10% to 80% charging in approximately 10 minutes. These charging stations connected to a utility power distribution network (grid) would draw massive peak power for a practical scenario in future as follows. At the peak fueling hour during the day, similar to 10 gasoline cars at a gas station fueling simultaneously in less than 10 minutes, 10 EVs would be parked for charging at Level 3 DC fast-charging station demanding charging from 10-80% at the same time. It would require 10 EVs×350 kW=3.5-megawatt (MW) peak power from distribution grid to support such demand. Extrapolating supply of such peak power for one station to the supply for in excess of 125,000 fast-charging station (equivalence of more than 125,000 gas stations) connected to the power grid in United States, each electric utility will likely have to massively overhaul the power distribution network, leading to one or more of more tax-payer money, additional capital expenditures to get into the rate base, and likely higher electric power rates, including penalty for demand charges that are similar to commercial and industrial customers today (for electricity end-use).

Variants of Level 3 technology, using bulk energy storage modules between the power grid and the Level 3 charging device, is under investigation. The technology attempts to reduce the peak power requirement from the distribution grid. Specifically, the DC fast charging electronics draws power from the bulk energy storage module which is connected to the grid via another set of electronics, managing peak power from the grid to a lower value. Therefore, at the cost of additional capital equipment, the energy storage modules act as a power buffer between the grid and DC fast charging devices. However, let's estimate the effectiveness of this bulk energy storage module in the context of enabling wide-spread adoption of EV. Today, average gas stations sales in the US is approximately 4,000 gallons per day which equates to approximately 30 MWh of energy demand (based on reasonable mileage assumptions of gasoline cars) from EV charging stations in the future. Factoring the peak fueling hours of vehicles (early morning and evening office commutes) and based on reasonable assumptions of battery MWh size, it is obvious that the grid peak power requirement (for this new Level 3 technology based on energy storage) can still be in MWs.

Overhauling utility electric power distribution networks to supply such peak power demands, with or without bulk energy storage modules as a power buffer, is technically feasible. However, electric utilities or investors/businesses would require not only significant capital investment, but also face a long regulatory process for approval of MW level substations for each DC fast charging stations connected to the grid. Cumulative impacts of all of the above may gradually counter the wide-spread adoption of EV. The aforementioned challenges with battery-charging-infrastructure for EV is due to the way power systems are designed, and how electricity flows from generation to end-use for EV charging. Factoring the losses from generation to end-use, and the massive overhaul requirement of power grid in future, it is not a surprise that many enthusiasts challenge the overall carbon emission of EV with respect to gasoline since more than 10% of the power is lost from generation to the end-use of electricity. The negative perception is compounded since dispatchable generation sources are mostly fossil power plants, as the renewable power plants such as utility scale solar and/or wind are not dispatchable. Therefore, Electricity used to charge the EV battery is generated from fossil fuel generation as well.

Specifically, for EV charging, embodiments of the system, apparatus and methods disclosed herein presents a zero-emission generation to end-use infrastructure which solves the aforementioned problem with EV battery charging infrastructure of future.

SUMMARY OF THE INVENTION

In one aspect, a system for charging at least one electric vehicle (EV) is provided. The system includes at least one transportable battery-energy-storage DC systems (BESDCS). The system also includes at least one renewable direct-current (DC) power supply station at a first location. The renewable DC power supply station is substantially stationary, and it is substantially dedicated for charging at least one BESDCS. The system also includes at least one DC charging station for charging of the at least one EV at a second location different from the first location. The system further includes at least one electric tanker transport including at least one electric truck vehicle configured to be coupled to the at least one BESDCS. The electric tanker transport is configured to transport the at least one BESDCS from the first location to the second location for charging of the at least one EV. The electric tanker transport is also configured to transport the at least one BESDCS from the second location to the first location.

In a further aspect, a method of using a system for charging at least one electric vehicle (EV) is provided. The system includes at least one transportable battery-energy-storage DC systems (BESDCS). The system also includes at least one renewable DC power supply station. The system further includes at least one DC charging station. The system also includes at least one electric tanker transport system that includes at least one electric truck and the at least on BESDCS. The method includes measuring an energy demand over a pre-defined period at the at least one DC charging station. The method also includes measuring an energy supply over a pre-defined period at the at least one renewable DC power supply station. The method further includes determining the location of the at least one electric tanker transport. The method also includes measuring the state of charge of the at least one battery. The method further includes facilitating communication among the at least one BESDCS, the at least one renewable DC power supply station, the at least one DC charging station, and the at least one electric tanker transport. The method also includes performing predictive analytics and logistics evaluations to facilitate substantially meeting power demand at the at least one DC charging station for charging of the at least one EV by the power supplied from the at least one BESDCS.

In another aspect, a system for charging at least one electric vehicle (EV) is provided. The system includes at least one transportable battery-energy-storage DC systems (BESDCS), at least one renewable direct-current (DC) power supply station at a first location and at least one DC charging station substantially dedicated for charging of the at least one EV at a second location different from the first location. The DC charging station is configured to receive substantially all power for charging the at least one EV from the at least one BESDCS. The system further includes at least one electric tanker transport comprising at least one electric truck vehicle configured to be coupled to the at least one BESDCS. The electric tanker transport is configured to transport the at least one BESDCS from the first location to the second location for charging of the at least one EV and transport the at least one BESDCS from the second location to the first location.

In a further aspect, a method of using a system for charging at least one electric vehicle is provided. The system includes at least one transportable battery-energy-storage DC systems (BESDCS), at least one renewable DC power supply station, at least one DC charging station. The system also includes at least one electric tanker transport system including at least one electric truck and the at least one BESDCS. The method includes charging the at least one EV from the at least one BESDCS and allocating sufficient energy in the at least one BESDCS for towing the at least one BESDCS to the at least one renewable DC power supply station via the at least one electric tanker transport.

In another aspect, a system for charging at least one electric vehicle (EV) is provided. The system includes at least one transportable battery-energy-storage DC systems (BESDCS), at least one renewable direct-current (DC) power supply station at a first location. The system further includes at least one DC charging station for charging of the at least one EV at a second location different from the first location. The system further includes at least one electric tanker transport. The at least one electric tanker transport further includes at least one electric truck vehicle including an electric drive train. The at least one electric truck vehicle is configured to be coupled to the at least one BESDCS. The BESDCS further includes at least one battery, at least one battery rack configured to receive the at least one battery, and at least one power electronics system. The at least one power electronics system is configured to charge the at least one battery from the at least one renewable DC power supply station and charge the at least one EV from the at least one battery at the at least one DC charging station. The at least one power electronics system is further configured to provide power to the electric drive train of the at least one electric truck vehicle. The at least one electric tanker transport is configured to transport the at least one BESDCS from the first location to the second location for charging of the at least one EV and transport the at least one BESDCS from the second location to the first location.

In a further aspect, a method of using a system for charging at least one electric vehicle (EV) is provided. The system includes at least one transportable battery-energy-storage DC systems (BESDCS), at least one renewable direct-current (DC) power supply station at a first location. The system further includes at least one DC charging station for charging of the at least one EV at a second location different from the first location. The system further includes at least one electric tanker transport. The at least one electric tanker transport further includes at least one electric truck vehicle including an electric drive train. The at least one electric truck vehicle is configured to be coupled to the at least one BESDCS. The BESDCS further includes at least one battery, at least one battery rack configured to receive the at least one battery, and at least one power electronics system. The at least one power electronics system is configured to charge the at least one battery from the at least one renewable DC power supply station and charge the at least one EV from the at least one battery at the at least one DC charging station. The at least one power electronics system is further configured to provide power to the electric drive train of the at least one electric truck vehicle. The at least one electric tanker transport is configured to transport the at least one BESDCS from the first location to the second location for charging of the at least one EV and transport the at least one BESDCS from the second location to the first location. The method includes measuring an energy demand over a pre-defined period at the at least one DC charging station. The method also includes measuring an energy supply over a pre-defined period at the at least one renewable DC power supply station. The method further includes determining the location of the at least one electric tanker transport. The method also includes measuring the state of charge of the at least one battery. The method further includes facilitating communication among the at least one BESDCS, the at least one renewable DC power supply station, the at least one DC charging station, and the at least one electric tanker transport. The method also includes performing predictive analytics and logistics evaluations to facilitate substantially meeting power demand at the at least one DC charging station for charging of the at least one EV by the power supplied from the at least one BESDCS.

In another aspect, a movable system for charging at least one electric vehicle (EV) is provided. The system includes at least one electric tanker transport. The electric tanker transport further includes at least one electric truck vehicle including an electric drive train, and at least one battery energy storage direct-current (DC) system (BESDCS). The electric truck vehicle is configured to be coupled to the at least one BESDCS. The at least one BESDCS includes at least one battery, and at least one power electronics system. The at least one power electronics system is configured to charge the at least one battery from at least one direct-current (DC) power supply and charge the at least one EV from the at least one battery. The at least one power electronics system is also configured to provide power to the electric drive train of the at least one electric truck vehicle. The system further includes a coupling element for providing cooling to the battery racks and power electronics system. The at least one electric tanker transport is also configured to transport the at least one BESDCS from the first location to the second location for charging of the at least one EV and transport the at least one BESDCS from the second location to the first location for charging the at least one battery from at least one DC power supply.

BRIEF DESCRIPTION OF THE DRAWING

These and other features, aspects, and advantages of the present disclosure will become better understood when the following detailed description is read with reference to the accompanying drawings in which like characters represent like parts throughout the drawings, wherein:

FIG. 10A illustrates an embodiment of BoS of a renewable DC power supply station, in accordance with the disclosure.

FIG. 10B illustrates yet another embodiment of BoS of a renewable DC power supply station, in accordance with the disclosure.

FIG. 12A illustrates a prior-art conventional wind power plant, and FIG. 12B illustrates an embodiment of Wind DC power supply station system, in accordance with the disclosure, and present a comparison of Wind DC power supply station with a conventional wind power plant is shown.

Unless otherwise indicated, the drawings provided herein are meant to illustrate key inventive features of the disclosure. These key inventive features are believed to be applicable in a wide variety of systems comprising one or more embodiments of the disclosure. As such, the drawings are not meant to include all conventional features known by those of ordinary skill in the art to be required for the practice of the disclosure.

DETAILED DESCRIPTION OF THE INVENTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise This disclosure relates generally to systems, apparatus and methods for battery-charging-infrastructure to enable wide-spread adoption of Electric Vehicles (EVs). More specifically, the embodiments described herein relates to systems, apparatus and methods of generation, transmission & distribution, and end-use of electricity defined as follows for EV charging:
  End-use: Charging multiple EVs at a charging station (analogues to a gas station for gasoline vehicles) that receives substantial power to charge EV from a mobile battery energy system
  Distribution: Supply of electricity to charging station from mobile battery-energy storage systems as opposed to from utility three or single-phase power transmission/distribution lines,
  Generation & Transmission: Generation of electric power from large-scale (hundreds of kW and higher) PV Solar or Wind and storing the electric power into energy storage modules for transportation (aka transmission) to EV charging station using a mobile system as opposed to transmitting power from high voltage power transmission lines.

Figure 1:
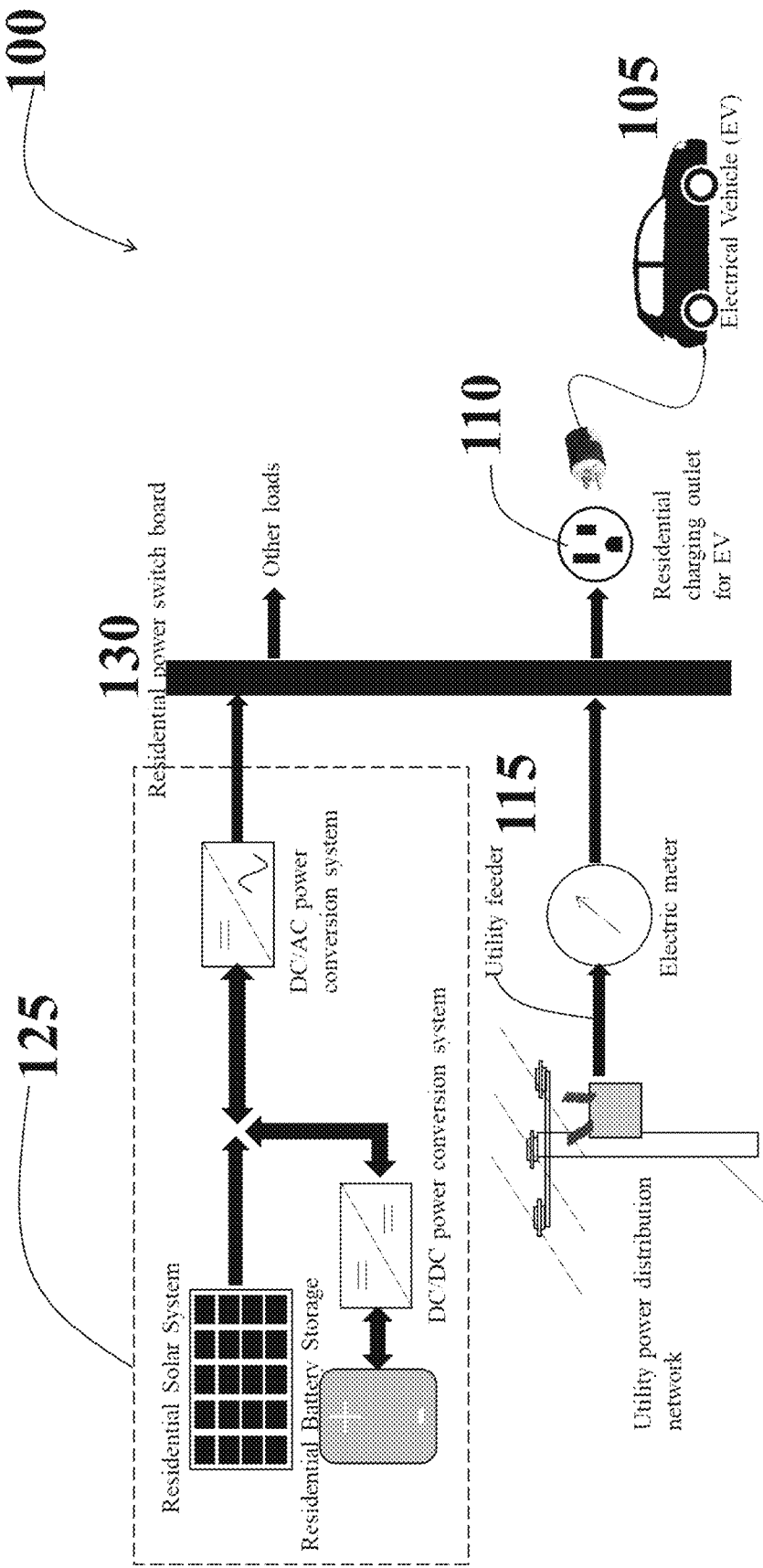
FIG. 1 illustrates a prior-art EV charging system in a residential power system.

FIG. 1 illustrates a residential power system 100 in which an electric vehicle (EV) 105 is charged from the AC power outlet 110. The power for charging the EV 105 is mainly drawn from utility power distribution feeder 115 that is coupled to Utility distribution system 120. Alternatively, a residential power system may also include an onsite Solar and/or battery storage system 125 that can supply power for charging the EV 105 via the electrical junction 130. Such charging system 100 is typically referred to as AC charging system. Overall, due to the limitation on the power rating (peak) of the residential power system 100 (including that of utility feeder 115) the power rating of the AC power outlet 110 is also limited, leading to long charging time (typically 4+ hours for an EV with 100 kWh battery pack). In theory, by increasing the rating of residential power system 100, the rating of AC power outlet 110 (for charging the EV 105) can be increased to reduce the charging time to a lower value, however, such system will also require higher current rating utility feeder 115, raising safety hazard concerns and increasing peak power requirement from the Utility distribution system 120.

Figure 2:
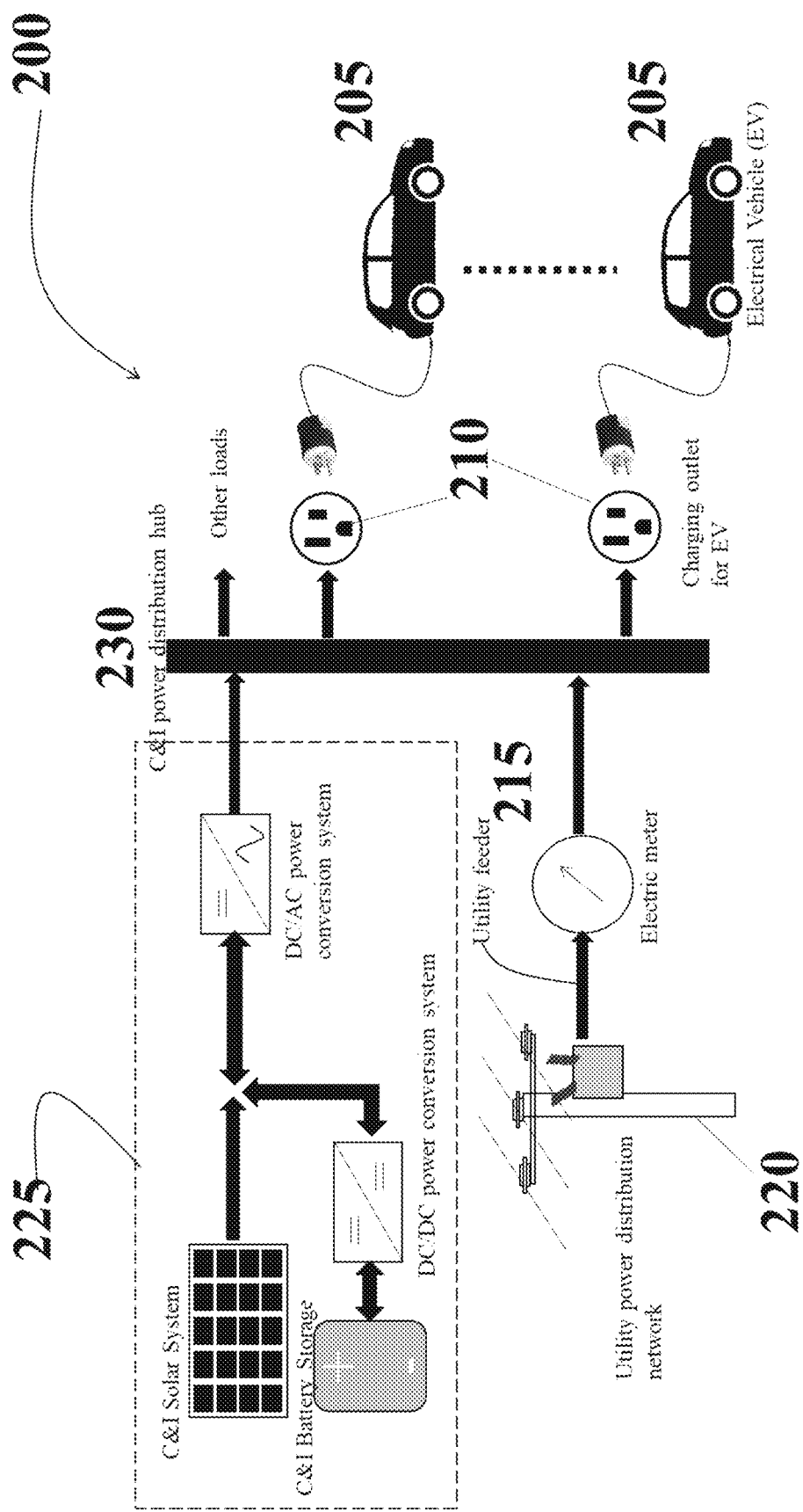
FIG. 2 illustrates a prior-art EV charging system in a commercial & industrial (C&I) power system.

FIG. 2 illustrates a commercial and industrial (C&I) power system 200 in which EVs 205 are charged from AC power outlets 210. The power for charging the EVs 205 is mainly drawn from utility feeder 215 that is coupled to Utility power distribution network 220. Optionally, an onsite or installed in neighborhood, Solar and/or battery storage system 225 may exist that can also supply power for EV charging via the electrical junction 230. Overall, due to the limitation on the power rating (peak) of the C&I power system 200 (including utility feeder 215) the power rating of AC power outlet 210 is also limited, leading to long charging time (typically 2+ hours for an EV with 100 kWh battery pack). In theory, by increasing the rating of C&I power system 200, the rating of AC power outlets 210 for EV charging can be increased to reduce the charging time to a lower value, however, such system will require higher rated utility feeder 215, leading to safety hazard and increased peak power requirement from utility power distribution network 220. Whereas, few such installations are feasible to catalyze the adoption of EV, or to partially charge the EV, but, in order to enable mass adoption of EV, such electrical infrastructure at each C&I facility is substantially challenging due to massive overhaul requirement of Utility power distribution network.

Figure 3:
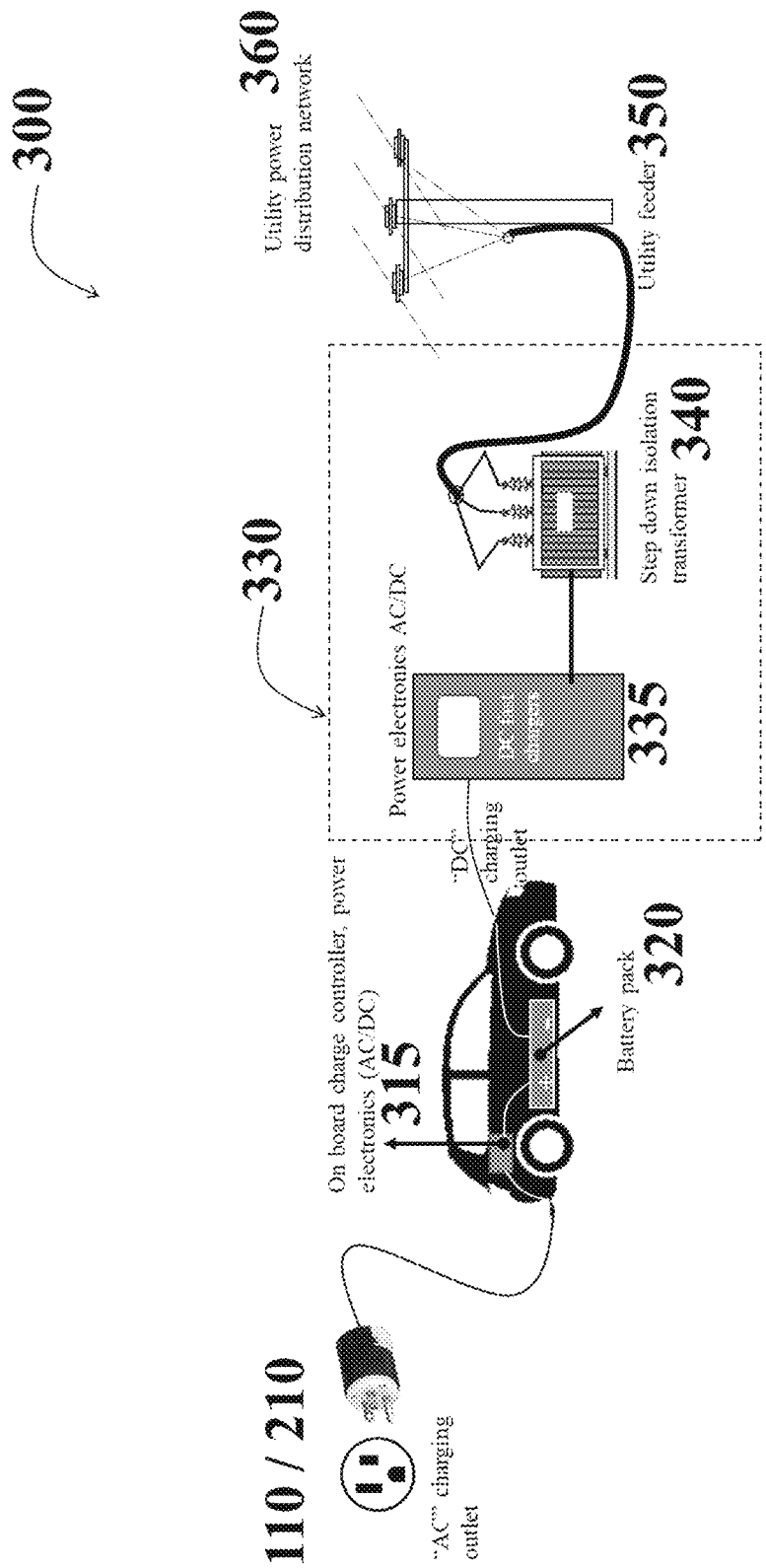
FIG. 3 illustrates a prior-art DC fast charging method for EV and limitation of AC charging method.

FIG. 3 illustrates DC fast charging system 300 well known in the art for EV charging. An AC power outlet 310 (essentially same as 110 and 210) for AC charging of EVs from an AC power system (essentially same as residential power system 100 or C&I power system 200) is also shown for a comparison with DC fast charging. In AC charging system, the charging time is limited by 1) Peak power rating of the AC charging outlet 310, 2) Peak power capacity of the EV on-board charge controller 315, which converts AC power to a DC power for the battery pack 320, and 3) Thermal limitation of the on-board charge controller 315 and battery pack 320. In DC charging system 300, the battery pack 320 is directly connected to the DC power source 330, sited in a commercial/industrial facility. Therefore, within the limitation of thermal management, the battery pack 320 can accept much higher DC power from the DC power source 330, leading to charging time less than an hour. The charging time in a DC charging system 300 is therefore limited by the power rating of the DC power source 330 and the components inside the DC power source 300 such as shown in FIG. 3 DC fast charger power electronics 335, step-down isolation transformer 340, and the peak power rating of utility feeder 350 that couples the DC power source 330 to Utility distribution network 360. Whereas, few such installations are feasible to catalyze the adoption of EV, or to partially charge the EV, but, in order to enable mass adoption of EV, such electrical infrastructure at each charging station is substantially challenging due to massive overhaul requirement of Utility power distribution network, as descried in the subsequent paragraphs.

Figure 4:
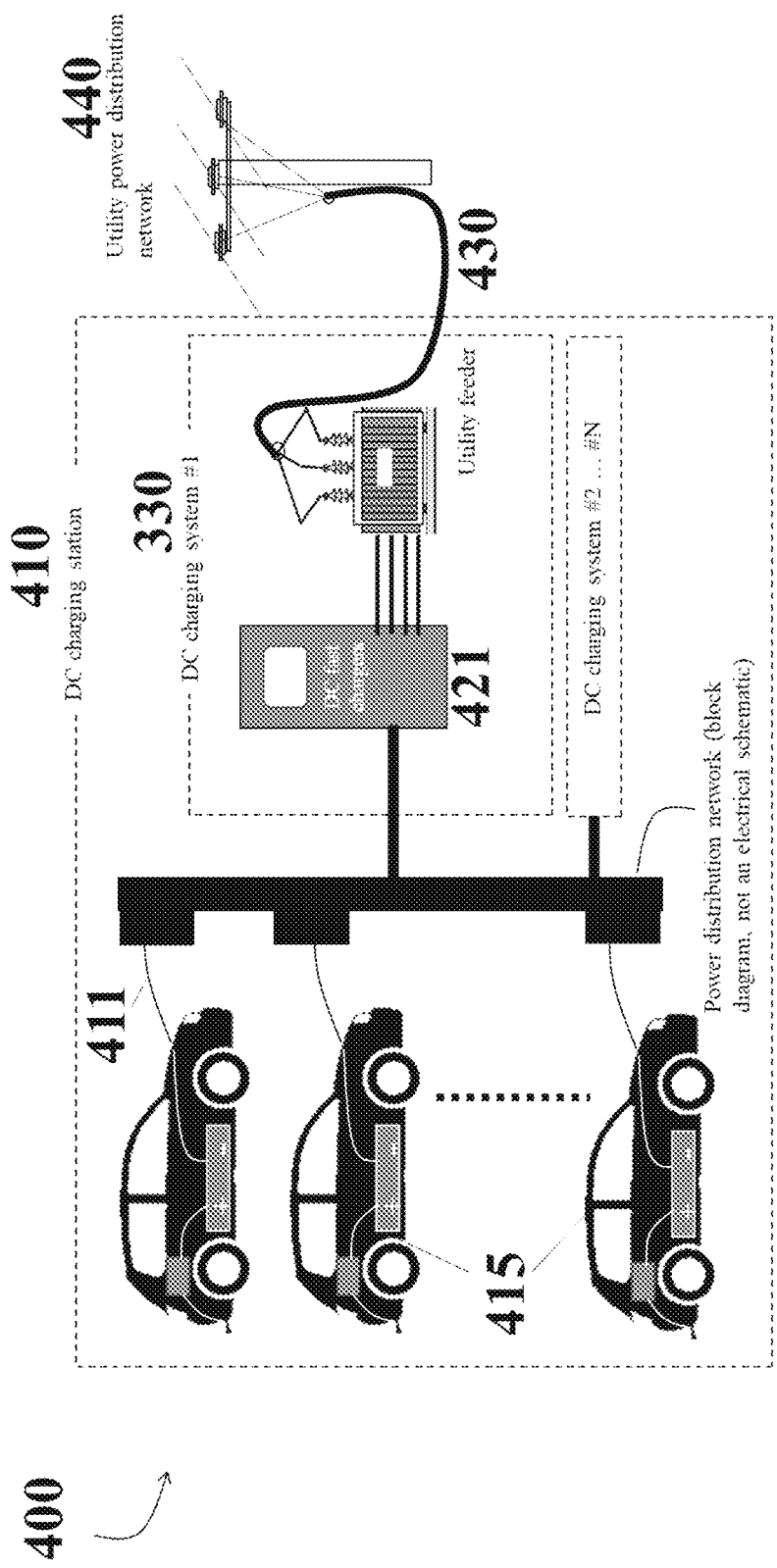
FIG. 4 illustrates a prior-art DC fast charging station where EVs are parked for charging.

FIG. 4 is a block diagram illustrating a power system 400 for DC fast charging station 410 where multiple EVs 415 are parked for charging. Multiple DC power source 420 (essentially the same as 330 in FIG. 3) can be used to increase the capacity of the DC charging station 410. Here, the capacity refers to number of EVs 415 that can be charged simultaneously in a DC charging station 410. The DC charging station refers to an infrastructure where multiple DC power source 420 comprising DC fast charging power electronics 421) are installed.

In a practical scenario in future (×100 million EVs on the road), each of the DC charging stations may draw massive peak power from the utility distribution network 430 as follows: At the peak traffic hour during the day (morning/evening rush hours), as an example, similar to ten (as an example) gasoline cars at a gas station fueling simultaneously in less than ten minutes, ten EVs 415 would be parked for charging at DC charging station 410, demanding simultaneous charging. With the rating of DC power source 420 for charging EVs approximately 350 kW, ten EVs would require in excess of 10 EVs×350 kW=3.5 MW power from a group of DC power source 420, which in turn would draw more than 3.5 MW power from the utility feeder 430 that couples the DC charging station 410 to the Utility power distribution network 440. Extrapolating such peak power supply (from the grid) for one station to the supply for 125,000+ fast-charging station (equivalence of 125,000+ gas station today in United States) connected to power grid in United States, Utilities companies will have to massively overhaul the power distribution network 440, leading to more tax-payer money and higher rate ($/kWh) for charging, which may get worse including demand charges, a penalty that C&I customer typically incur when power is drawn at peak hours.

Figure 5:
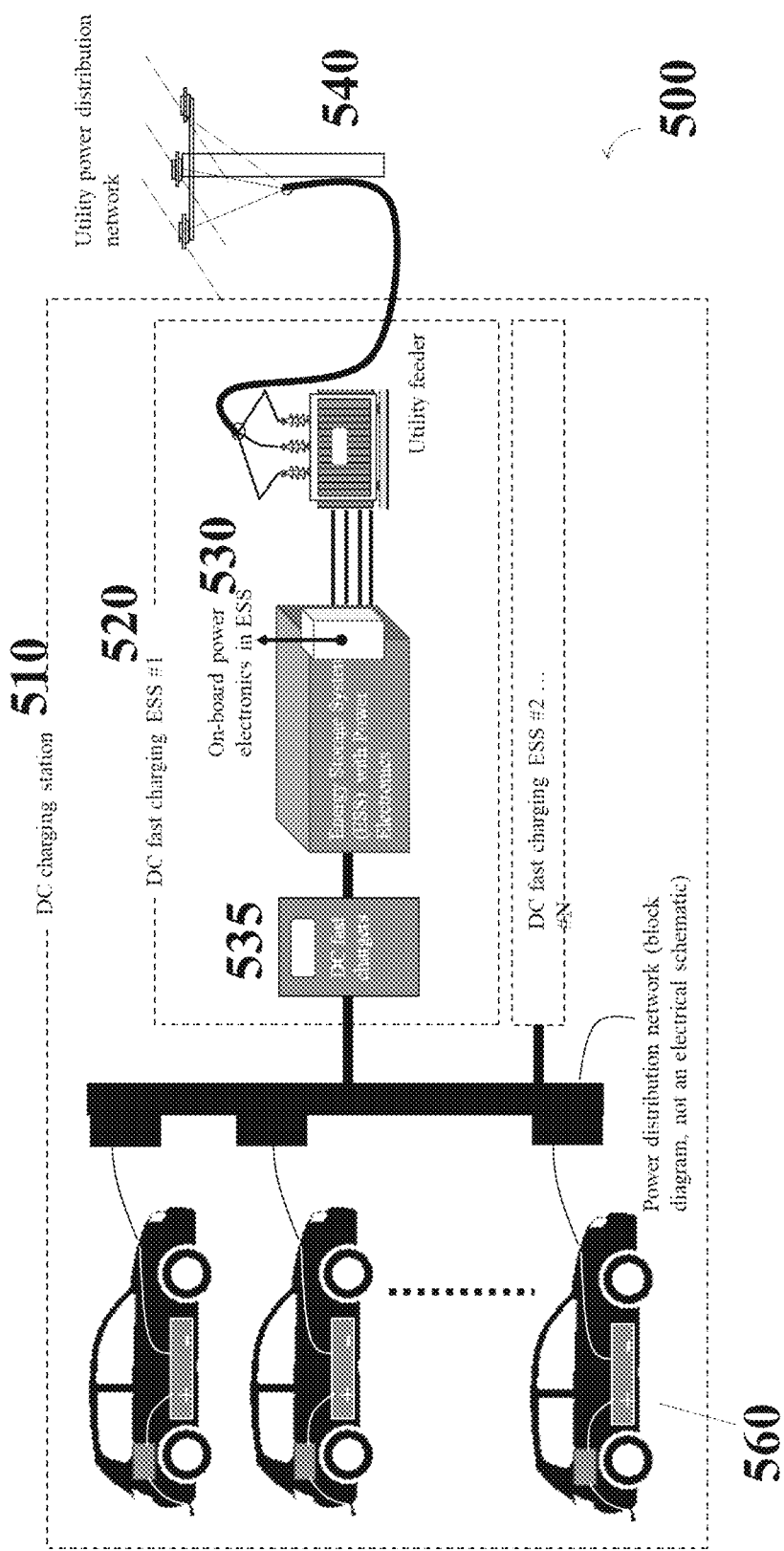
FIG. 5 illustrates a prior-art DC fast charging station with energy storage system (ESS).

FIG. 5 is a block diagram illustrating a power system 500 for DC fast charging station 510 that includes a DC power source 520 with an energy storage system (ESS) 530 along with DC fast charger electronics 535. The ESS 520 includes a bulk battery storage system (or any other electric storage system such as flow batteries, Zinc metal etc. well known in the art), power conversion system (from AC to DC and/or DC/DC) that are not shown in FIG. 5. Such ESS 520 are well known in the art; It has been deployed in many applications for Utility to provide ancillary services and in many applications for C&I customer to reduce demand charges.

The DC fast charging station 510 is essentially a variant of DC charging station 410 illustrated in FIG. 4. The ESS 530 reduces the peak power requirement from the Utility power distribution network 540 since the DC fast charger power electronics 535 draws power from the ESS 530, which provides energy buffer and thereby decouples the instantaneous power demand for charging the EVs 560 from the instantaneous power supply required from the Utility power distribution network 540.

However, let's estimate the effectiveness of this ESS 530 in the context of enabling wide-spread adoption of EV: Today, average gas stations sales in US is 4,000 gallons per day which equates to approximately 30 MWh of energy demand (based on reasonable mileage assumption of gasoline cars) from DC charging stations in future. Factoring the peak fueling hours of vehicles (early morning and evening office commutes) and based on reasonable assumption of battery MWh size, it is evident that the grid peak power requirement would still be greater than one MW.

Figure 6:
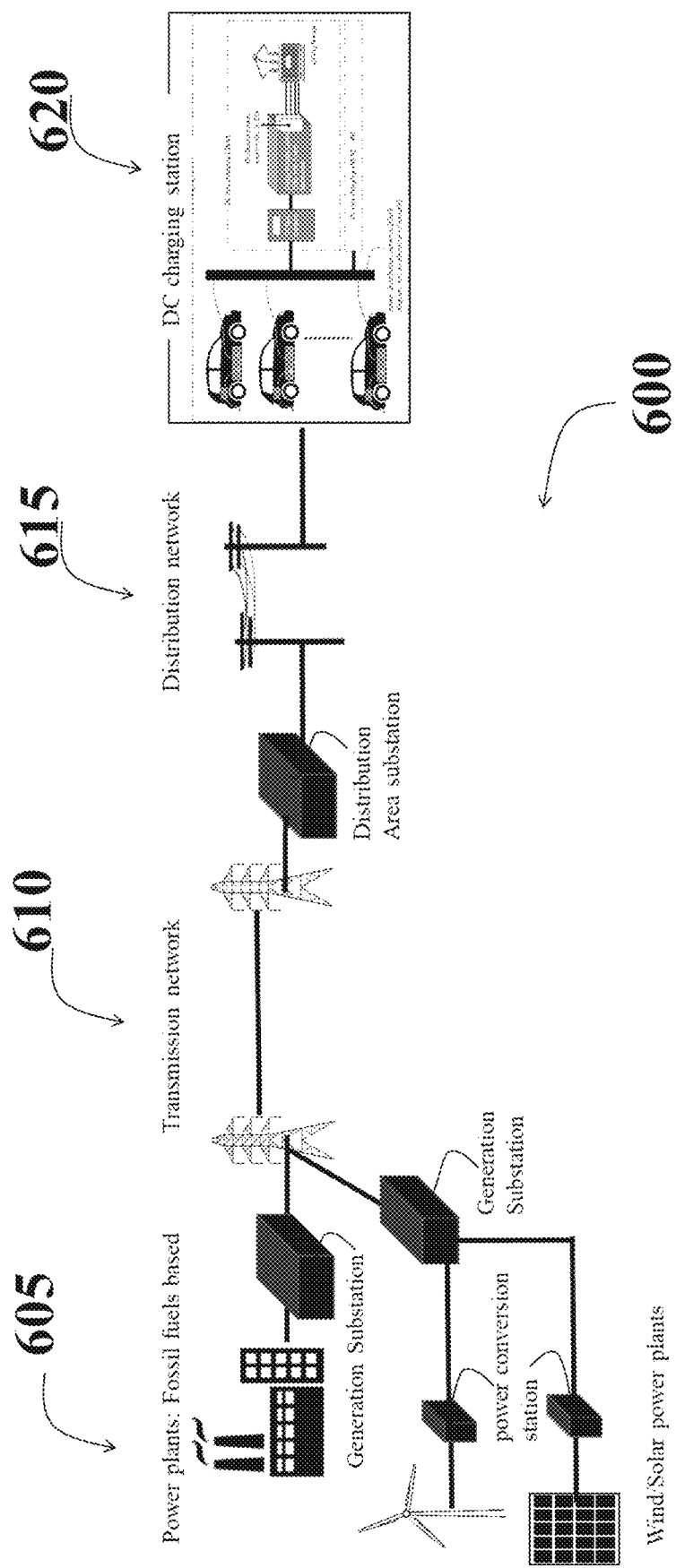
FIG. 6 illustrates a prior-art 'power generation to end-use' system for DC fast charging station with or without ESS.

FIG. 6 is a block diagram of conventional 'power generation to end-use' system 600 highlighting power generation 605, transmission 610, distribution 615 and end-use 620 for DC charging of EVs. System 600 illustrates how AC power generated from one location is delivered for charging of EVs at DC charging station 630. From the discussion so far, it is clear that the peak power requirement of DC charging station whether is based on ESS 510 or without ESS 410, can be in the range of 1 MW-3.5 MW (or higher). For 125,000+DC charging station (equivalence of 125,000+ gas stations) in United States, the capacity requirement from the grid can therefore be in the range 125 GW-1,000 GW. Therefore, not only distribution network 615, but the transmission network 610 along with electrical substations 635 will have to be massively upgraded to meet the EV charging demand. New fossils or renewable power plants in the order of 100s of GWs will be required. With ever decreasing cost of generation, Solar and Wind energy may likely be the best option to meet the EV charging demand. However, due to their non-dispatchable nature, the cost of end-use becomes very high. The cost further increases due to the significant losses in transmission and distribution of power from generation to end-use at the DC charging station. Finally, the electric current in the power grid follows the law of physics; the power at the EV charging station comes from both the renewable as well as fossil-fuel-based power plants. Therefore, the charging power for EV battery at the DC charging station 630 is not a 'true' zero-emission power. Whereas, the EV can be touted as zero emission technology, but, the electricity that is required to charge the EV battery is not a zero-emission electricity in the existing power system 600.

Figure 7:
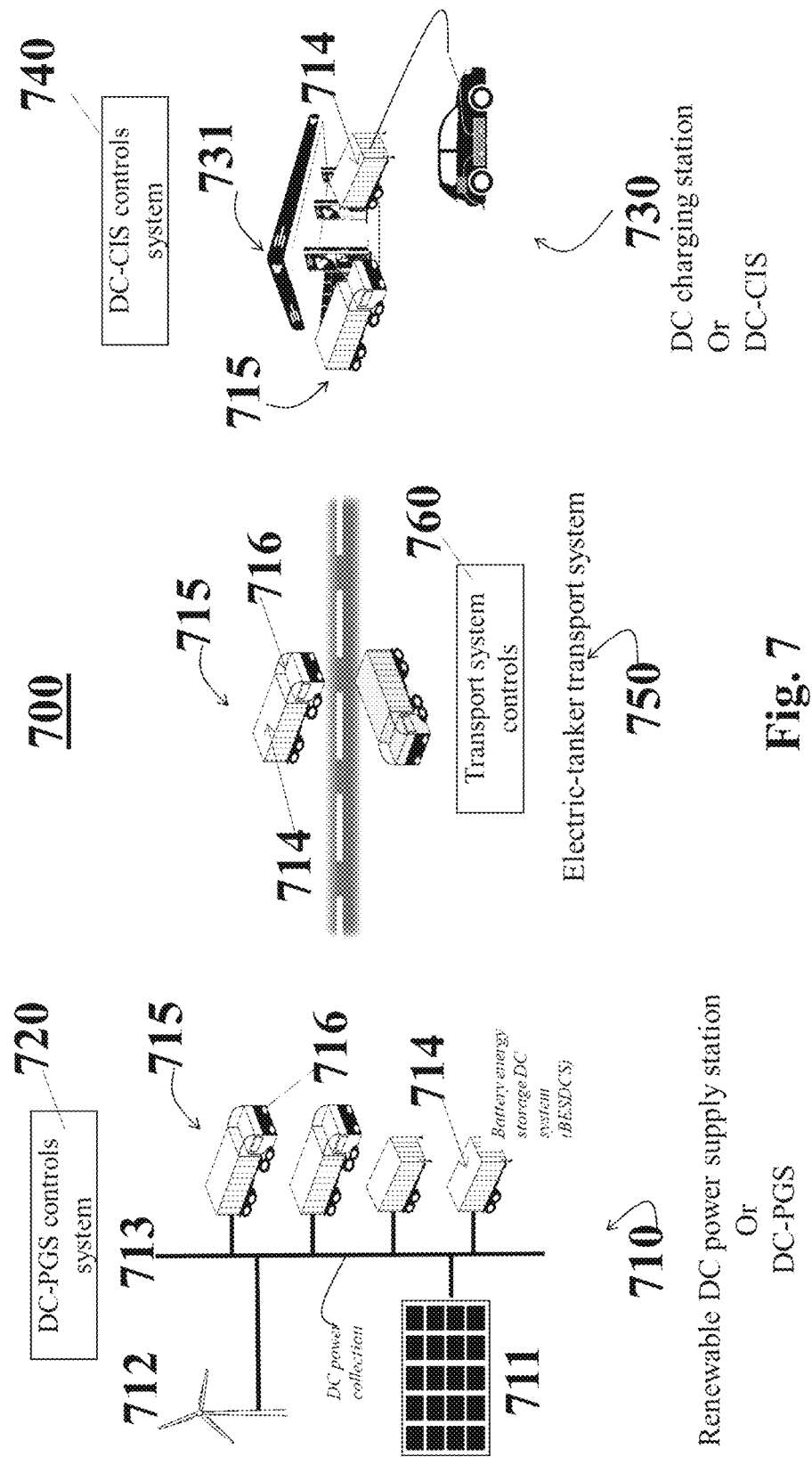
FIG. 7 illustrates an embodiment of a zero-emission EV charging (ZE-EVC) system, 'power generation to end-use', for DC fast charging of EV, in accordance with the disclosure.

FIG. 7 illustrates an embodiment of a charging system 700 for EVs. The system has the following sub-systems:

1) A renewable direct-current (DC) power supply station 710: The renewable DC power supply station 700 includes large-scale (100s of kW or higher) renewable power generation system such as photovoltaic (PV) solar arrays 711 or wind turbines 712 or a combination of solar arrays 711 or wind turbines 712 that are configured to generate DC output power compatible for charging (via coupling element 713) a movable large-scale Battery Energy Storage DC system (BESDCS) 714. The renewable DC power supply station 700 also includes electric-tanker 715 which is essentially an electric truck 716 and a BESDCS 714 coupled together for transporting the BESDCS 714 to and from another location. The PV solar arrays 711 or wind turbines 712 and BESDCS 714 in FIG. 7 include balance of plant equipment (not shown in FIG. 7) such as dc/dc power converters, cables, fuses etc. to generate matching electrical voltage and currents in order to charge the batteries (not shown in FIG. 7) of BESDCS 714. In FIG. 7, some BESDCS 714 are shown without electric truck 716 whereas they are shown together as electric-tanker 715. The overall idea is that a renewable DC power supply station 700 generates power for storing in one or many BESDCS 714 which is movable; The electric-tanker 715 facilitates the mobility of BESDCS 714 from one location to another. From hereinafter the renewable DC power supply station 700 will be refereed as a DC Power Generation and Storage (DC-PGS) system. The DC-PGS system 700 is substantially different than conventional Solar or Wind power plants that generates AC power (i.e. AC voltage & current) compatible for coupling to the electric grid for power transmission & distribution. A detailed description of DC-PGS system 700 and its comparison with conventional AC systems is provided later in this document.

2) DC charging station 730 for charging EVs: This sub-system includes essentially the same movable BESDCS 714 and electric-tanker 715. The DC charging station 730 further includes a civil infrastructure 731 similar to that of a gas station, to accommodate many EVs for charging. The charging power for EVs 735 is drawn from BESDCS 714. Therefore, the DC charging station 730 does not rely on any external power source or utility distribution circuit for charging the EVs. The DC charging station 730 is analogous to an island system well known in the art that self-generate power (in this case from movable BESDCS 714) to supply its loads (in this case EVs 735). From hereinafter, the DC charging station 730 will be referred as DC Charging Island Station (DC-CIS) system. The DC-CIS 730 is also analogous to gas station in that electric-tanker 715 is analogous to a gas-tanker; Both electric-tanker 715 and gas-tanker bring stored energy from one location to charge vehicles at another location. The capacity of a DC-CIS 730 can be easily scaled by increasing or decreasing the number of BESDCS 714 via the electric-tanker 715. Further description of DC-CIS 730 is provided later in the document.

3) Electric-tanker transport system 750: The electric-tanker transport system 750 includes fleet of electric-tankers 715 that include BESDCS 714 and electric-truck 716. The electric-tankers 715 with electric-truck 716 (driver seated or autonomous), analogues to a gasoline tanker truck that carries fuel for dispensing at gas stations, is used to transport substantially charged BESDCS 714 from DC-PGS system 710 to DC-CIS system 730; Likewise, the electric tankers 715 is also used to transport substantially discharged BESDCS 714 from DC-CIS system 730 to DC-PGS system 710. Besides performing many other function described in the subsequent paragraphs, the BESDCS 714 also supplies necessary power to the drive train (not shown in FIG. 7) of the electric truck 716 of the electric-tanker 715 during transportation.

Multiple such DC-PGS system 710, DC-CIS 730 and electric-tanker transport 750 can exist in a system 700 for charging EVs. Based on the supply (electric power generation and storage capacity at DC-PGS system 710) at one location and demand (electric power consumption at DC-CIS 730) at second location, location of electric-tanker transport 750 and BESDCS 714, state of charge of batteries of BESDCS 714, the logistics of moving BESDCS 714 is managed such that the energy demand at the DC-CIS 730 system (to charge the EVs 735) is met by energy supply from DC-PGS system 710. The controls system 720 of DC-PGS 710, controls system 760 of the electric tanker transport system 750 and the controls system 740 of the DC-CIS 730 are used to manage the logistics of the BESDCS 714 by performing for instance the aforementioned measurement and communicating among each other via a central controls system that is explained later in this disclosure.

Overall, the power is generated from renewable sources, it is stored in a battery and then transported to the EV charging station for end-use i.e. charging EVs. Note that Utility distribution power grid is not used in this primary mode of power generation to end-use system for EV charging. Also note that power is generated, transported and eventually used without any carbon di-oxide emission. Therefore, the present embodiment of the disclosure, a system for charging EV, is a Zero-Emission EV Charging (ZE-EVC) system, using 100% of its energy from renewable energy sources. Large number of such systems can be built without any implication on the grid since the power to charge an EV is drawn from BESDCS 714 at the DC-CIS 730. From hereinafter, the system for charging EV will be referred as ZE-EVC.

Figure 8:
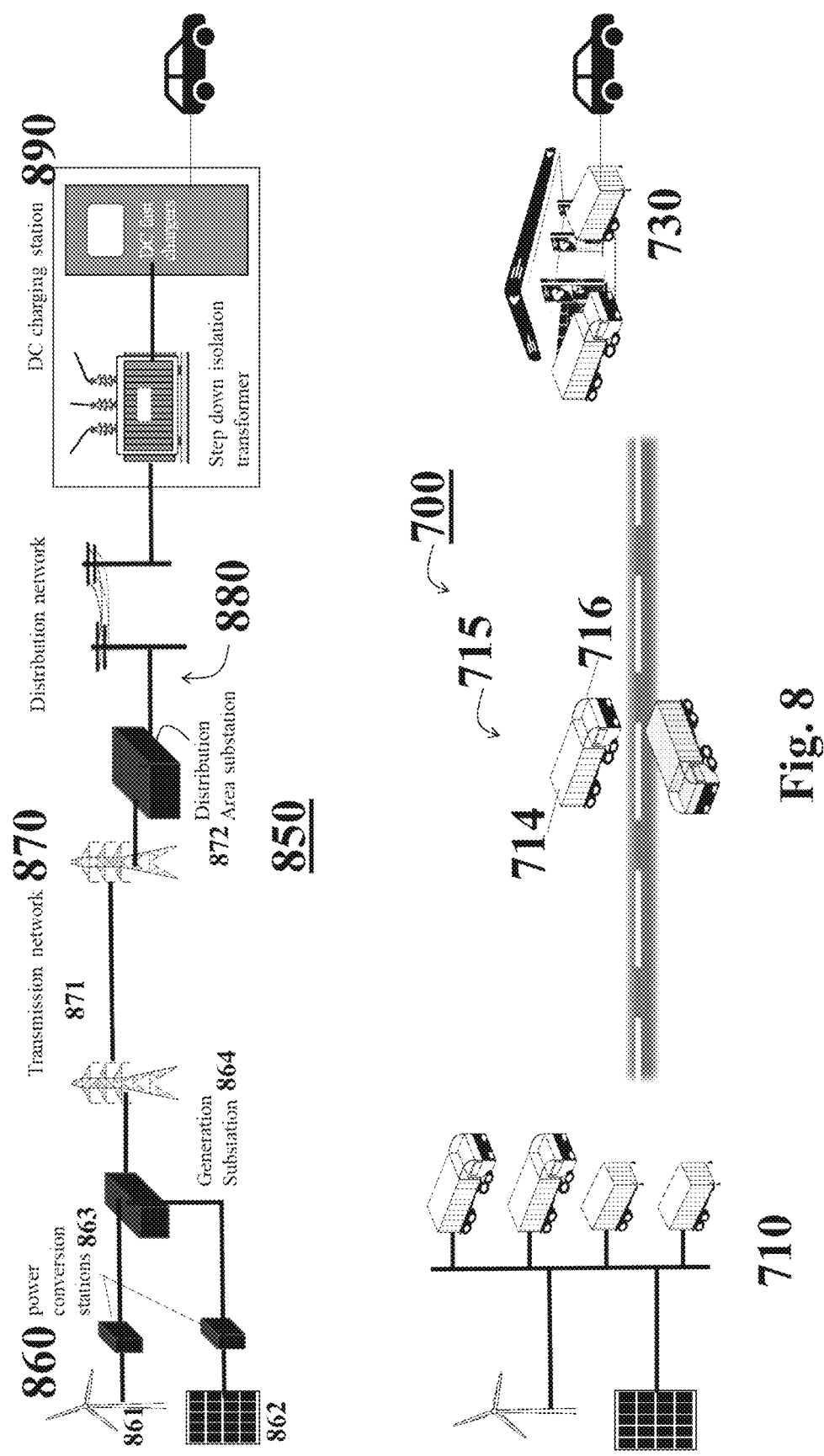
FIG. 8 further illustrates the ZE-EVC system, 'power generation to end-use', and compares it to the conventional system, in accordance with the disclosure.

FIG. 8 further illustrates a comparison of the ZE-EVC system 700, 'power generation to end-use' to the conventional system 850, in accordance with the disclosure. The electric tanker 715 enables seamless scalability of the charging infrastructure for EV. A fleet of electric tankers 715 in the ZE-EVC system 700 is equivalent to the combination of the following components in the conventional EV charging system 850 (power generation to end-use): power conversion 863, step up substation 864, power transmission 871, step down sub-station 872, utility power distribution network 880 and transformer & power conversion at the DC charging system 890. In the conventional system 850, from power generation to end-use, the power is processed through aforementioned components, leading to significant energy loss (in the order of 5-20%). This lost power (energy over time) is analogous to the consumed energy by electric truck 716 in transportation of BESDCS 714 between DC-PGS 710 and DC-CIS 730.

Figures 9, 9A, 9B:
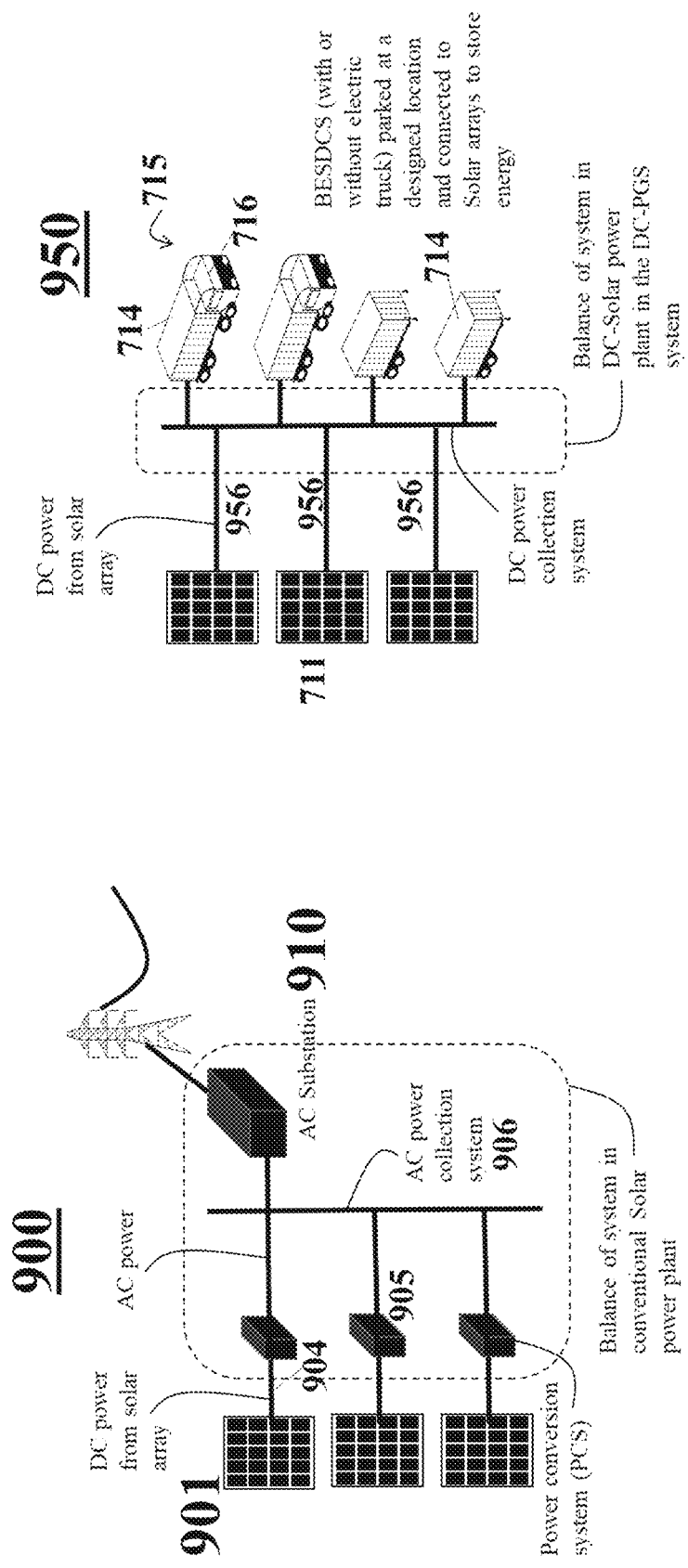
FIG. 9A illustrates a prior-art conventional solar power plant.
FIG. 9B illustrates an embodiment of a renewable DC power supply station, in accordance with the disclosure, and presents a comparison with balance of systems (BoS) of conventional solar power plant.

FIG. 9 illustrates a comparison between the balance-of-system (BoS) 900 of a conventional solar plant (FIG. 9A) and BoS 950 of a DC-PGS (FIG. 9B). In the BoS 900 of a conventional system, DC power from Solar arrays 901 is converted to an AC power and transformed to a higher voltage by the power conversion system (PCS) 905. AC power at higher voltage is collected at the substation 910 at which the cumulative AC power is further transformed to an even higher voltage for transmission. In contrast to the presence of DC cables 904, PCS 905, AC cable system 906, substation etc., in the BoS of a conventional system 900, the BoS 950 of DC-PGS 710 includes only DC cables 956 (including some minor components such as fuses, disconnect switches etc., not shown in FIG. 9B) that connects Solar arrays 711 to the BESDCS 714, advantageously resulting in much simpler system and low cost of power generation to storage. In one embodiment in accordance with the disclosure, the BESDCS 714 contains DC/DC power conversion electronics (not shown in FIG. 9) that performs both the MPPT (well known in the art) for Solar 711 and charge controls (well known in the art) for battery racks (not shown in FIG. 9) inside BESDCS 714. Further details of BESDCS 714 are provided in the subsequent sections.

FIG. 10A illustrates an embodiment of BoS 950 of the DC-PGS system 710. The BoS 950 includes DC/DC power converter 1002 to perform (via the coupling element 1003 such as cable, fuses etc) the main functions such as MPPT and charge controls, whereas, the power electronics inside the BESDCS 714 does not contain any DC/DC power converter to perform the main functions (MPPT and charge controls) to charge the battery racks (meaning batteries mounted on racks) inside BESDCS 714.

FIG. 10B illustrates yet another aspect of BoS 950 of the DC-PGS system 710. The BoS includes a partial power DC/DC converter 1052 whereas the BESDCS 714 includes another partial power DC/DC converter (integrated with power electronics inside the BESDCS 714, not shown in FIG. 10). The ratings of DC/DC converter 1052 in BoS 950 and the DC/DC converter (not shown in FIG. 10B) inside BESDCS 714 is carefully designed to optimize the overall cost of power electronics and weight of BESDCS 714 as demonstrated with the following example.

Reference is made to FIG. 10. Let's consider the peak power of the DC-Solar array 1001 or 1051 is 1 MW and the size of battery storage (same as battery racks) inside BESDCS 714 is 1 MWh. In order to charge the battery inside BESDCS 714 from 0 to 100% in one hour (as an example), the DC/DC converter can be sized as follows:

1) Method1: The rating of DC/DC converter inside BESDCS 714 (not shown in FIG. 10) is 100% i.e. 1 MW and there is no DC/DC converter to perform MPPT/Charging functions in the BoS 950 of the DC-PGS system 710
2) Method2: The rating of DC/DC converter in the BoS 950 of the DC-PGS system 710 is 100% i.e. 1 MW and there is no DC/DC converter to perform MPPT/Charging functions in the BESDCS 714
3) Method3: The rating of DC/DC converter in the BoS 950 is x % (i.e partial power), and the rating of DC/DC converter inside BESDCS 714 is 100–x %; Both DC/DC converter perform MPPT/charging function in coordination to process peak power of 1 MW. By advantageously reducing the rating of DC/DC converter in BESDCS 714, the transportation weight can be decreased, leading to lesser energy loss during transportation of BESDCS 714 from DC-PGS 710 to DC-CIS 730. However, the overall cost and complexity of BoS 950 in DC-PGS 710 is increased. Therefore, selection of x % partial rating of DC/DC converter is derived by performing system optimization.

Figure 11:
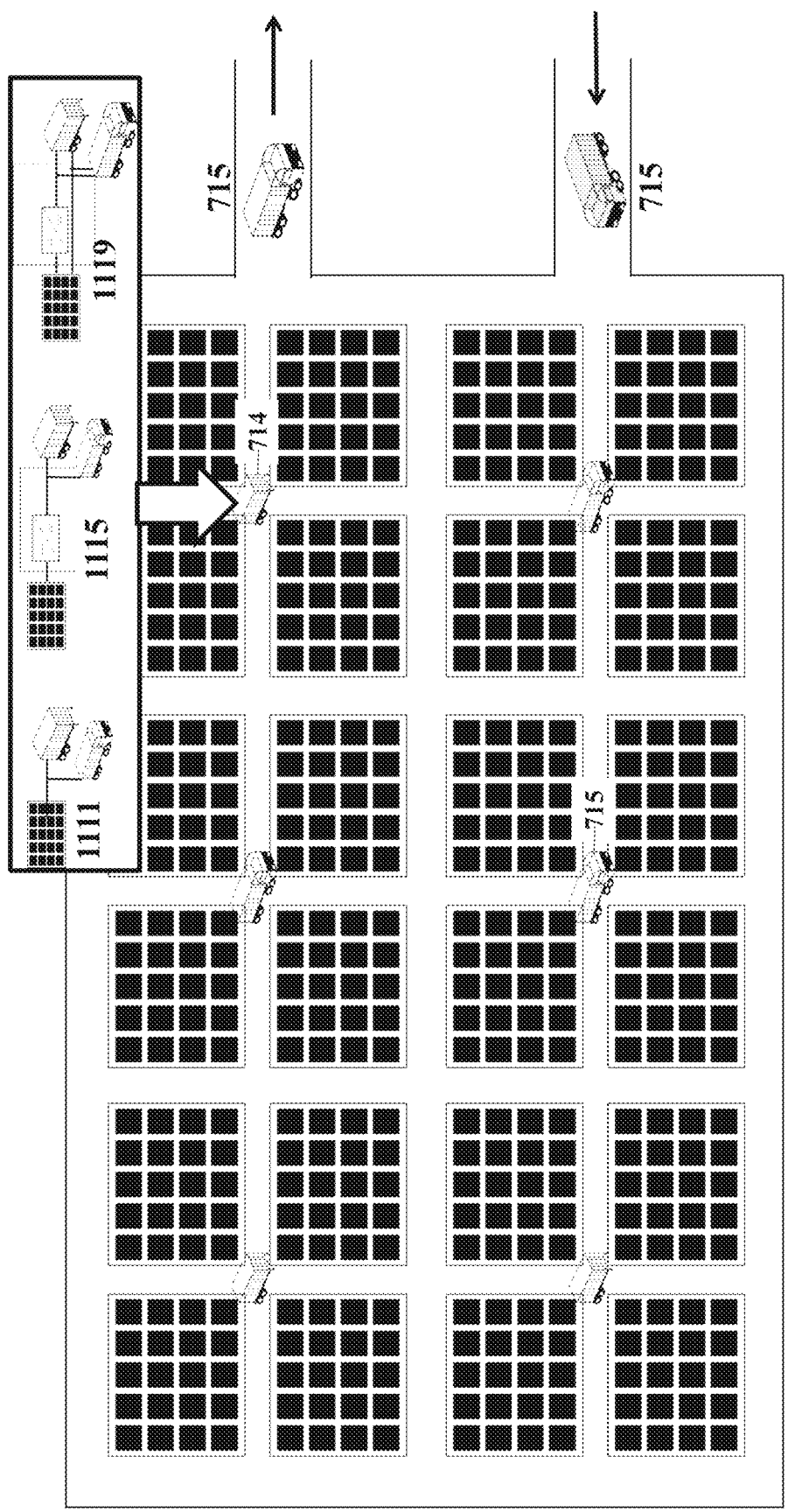
FIG. 11 illustrates an embodiment of Solar DC power supply station system, in accordance with the disclosure.

FIG. 11 illustrates an embodiment of Solar DC-PGS system 710, in accordance with the disclosure. Similar to PCSs (inverters and transformers, not shown in FIG. 11) which are installed to convert DC power from Solar to AC power for grid in a utility scale conventional solar system, the BESDCS 714 with or without electric truck 716 are parked, in a Solar DC-PGS 710 in the ZE-EVC system 700. As shown in FIG. 11, the BESDCS 714 can have 100% 1111, partial rated 1119 or no DC/DC 1115 converter to perform the main functions (MPPT and Charging controls)

FIG. 12 illustrates an embodiment of DC-PGS 710 with wind turbines in accordance with the disclosure and presents a comparison between a conventional wind power plant 1250 (FIG. 12A) and the wind DC PGS 710 system (FIG. 12B). The BoS 1220 of the Wind DC-PGS system 710 is extremely simple compared to BoS 1260 of the conventional Wind power plant 1250 connected to a power grid. Additionally, the PCS 1210 inside the wind turbine in DC-PGS system 710 has advantageously AC/DC conversion 1211 only. On the other hand, the PCS 1260 inside the wind turbine of a conventional wind power plants include AC/DC and DC/AC conversion stages 1261, resulting in more complexity and electrical losses. When connected as shown in FIG. 12, BESDCS 714 does not contain any DC/DC converter to perform the battery charging operation. The AC/DC converter 1211 inside the wind turbine can perform both the wind MPPT as well as battery charging operation. In another embodiment of the disclosure, as shown in FIG. 12, a common DC collector 1230 enables supply of auxiliary power (or standby power—well known in wind turbine system—which is required when wind turbines are not generating power) from BESDCS 714. This is possible since at any time at least one BESDCS 714 is connected to the common DC collector.

Special Notes on DC-PGS 710, its Definition, its Realization, and its Use:

While various embodiments of the DC-PGS 710 have been described, it is apparent that many modifications can be made without departing from the spirit and scope of disclosure. For example, the DC-PGS 710 can be a part of a large solar power plant; A portion of this large solar power plant can be conventional i.e. solar panels connected to the utility grid (using balance of systems components such as inverter, transformer, AC cable, substation etc.), whereas, the remaining portion can be a DC-PGS 710 system i.e. solar panels (not connected to the grid) are generating DC power compatible for storing in movable BESDCS 714.

Likewise, yet another variation is possible as follows: the DC-PGS 710 can be a part of large Solar+Storage (hybrid) power plant. In a conventional solar+storage power plant, solar panels and storage (battery based, or steam or air based) are connected to the utility grid via balance of system equipment. Therefore, in future, a portion of such power plants can be dedicated to just generate DC power and store it into a movable BESDCS 714, for shipping to DC-CIS 730.

Another obvious example is possible as follows: Existing solar power plants can be retrofitted to a DC-PGS 710 plant by performing 1) disconnecting the plant from grid, 2) eliminating the existing balance of systems, 3) using BESDCS 714. Alternatively, at the end of life (typically 25 years, term for standard power purchase agreement), by keeping the solar panels and eliminating rest of the electrical balance of system equipment, a DC-PGS 710 dedicated for EV charging can be realized. Such retrofit is practical since the life of a solar panel is generally much higher than the life of many balance of system equipment used in the solar power plant today.

Finally, in yet another variation of realizing a DC-PGS 710, curtailed energy from the existing solar power plant can be diverted from the panels to BESDCS 714. BESDCS 714 connected to the DC collection side of the existing solar system can very easily absorb the curtailed energy, which otherwise is wasted (not generated from solar panel) by controls of existing solar inverters.

Almost all of the above discussion can be applied to DC-PGS 710 based on wind (FIG. 12B) in a very analogous manner.

Next, a detailed description electric tanker transport (essentially same as 750 of FIG. 7) is provided.

Figure 13:
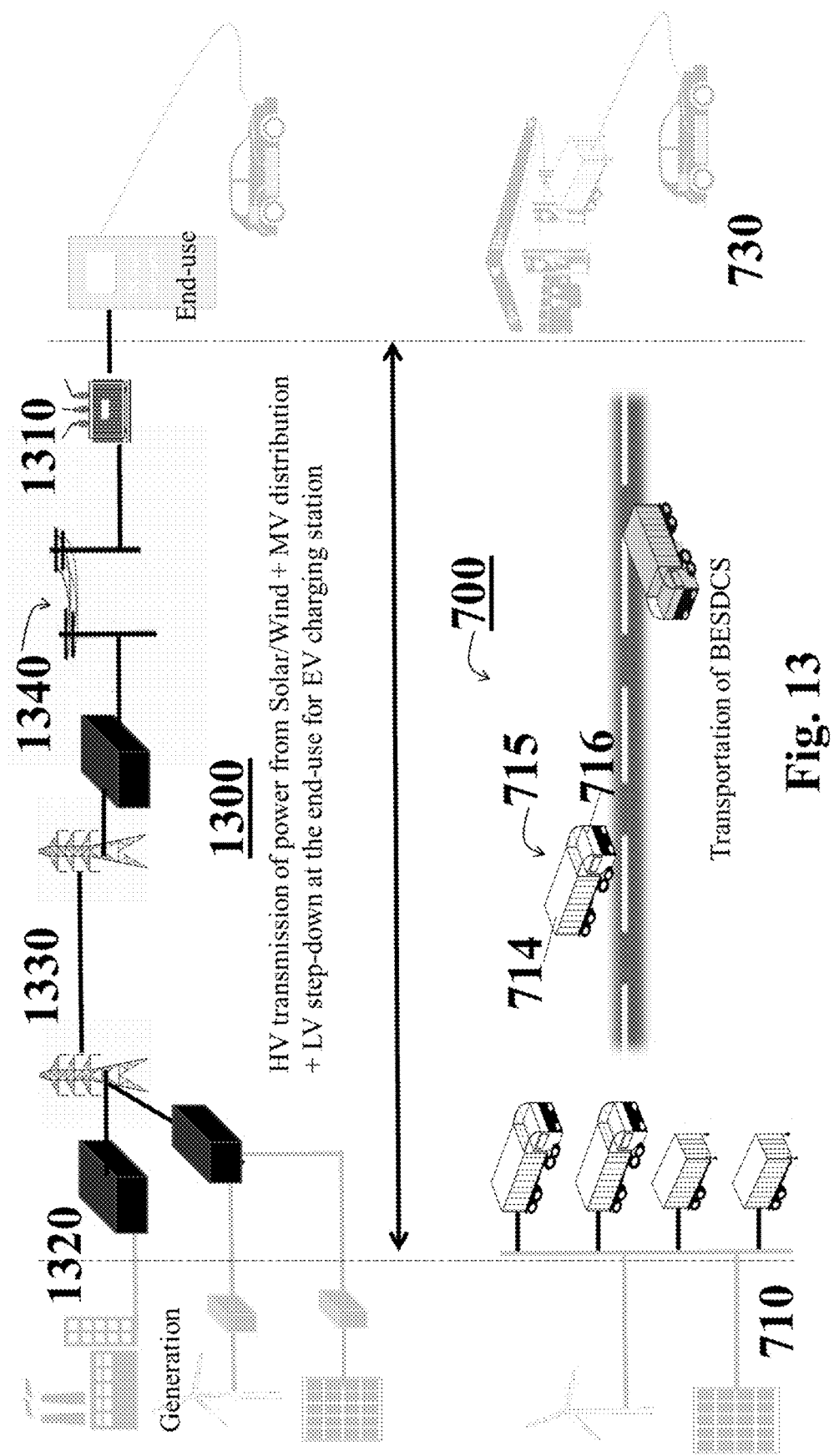
FIG. 13 illustrates a electric-tanker transport system.

FIG. 13 illustrates a contrast between the energy delivery in the conventional system 1300 and the ZE-EVC system 700. The power required at the DC charging station 1310 in the conventional system 1300 is instantaneously met by power generated at the AC generation facility 1320 via the transmission line 1330 and utility distribution system 1340. In the ZE-EVC system 700, power required at the DC-CIS 730 is met by power generated at the DC generation facility 710 by coordinating a fleet of movable BESDCS 714 coupled with electric truck 716, referred as electric-tanker 715 in an electric tanker transport system 750. At any given time, the electric-tanker transport system 750 coordination task includes, 1) Number of electric tankers 715 on the road—travelling from DC-PGS 710 to DC-CIS 730 and vice-versa, 2) Number of BESDCS 714 (with or without electric truck 716) at the DC-CIS 730 providing electric power to charge EVs, and the number of electric-truck 716 in standby mode, ready to carry the BESDCS 714 back to selected DC-PGS 710 for charging, and 3) Number of BESDCS 714 (with or without electric-truck 716) at the DC-PGS 710 connected to Solar or wind for charging, and the number of electric-truck in standby mode, ready to carry the BESDCS 714 to selected DC-CIS 730 for charging EVs.

In a ZE-EVC system 700, the total number of BESDCS 714, the size of power electronics and energy storage (not shown in FIG. 13) inside BESDCS 714 (as illustrated in the subsequent sections), number of electric trucks 716, power rating of DC-PGS 710 etc. are all a function of number of DC-CIS 730 along with the capacity of DC-CIS 730 to charge a number of EVs in that ZE-EVC system 700.

Figure 14:
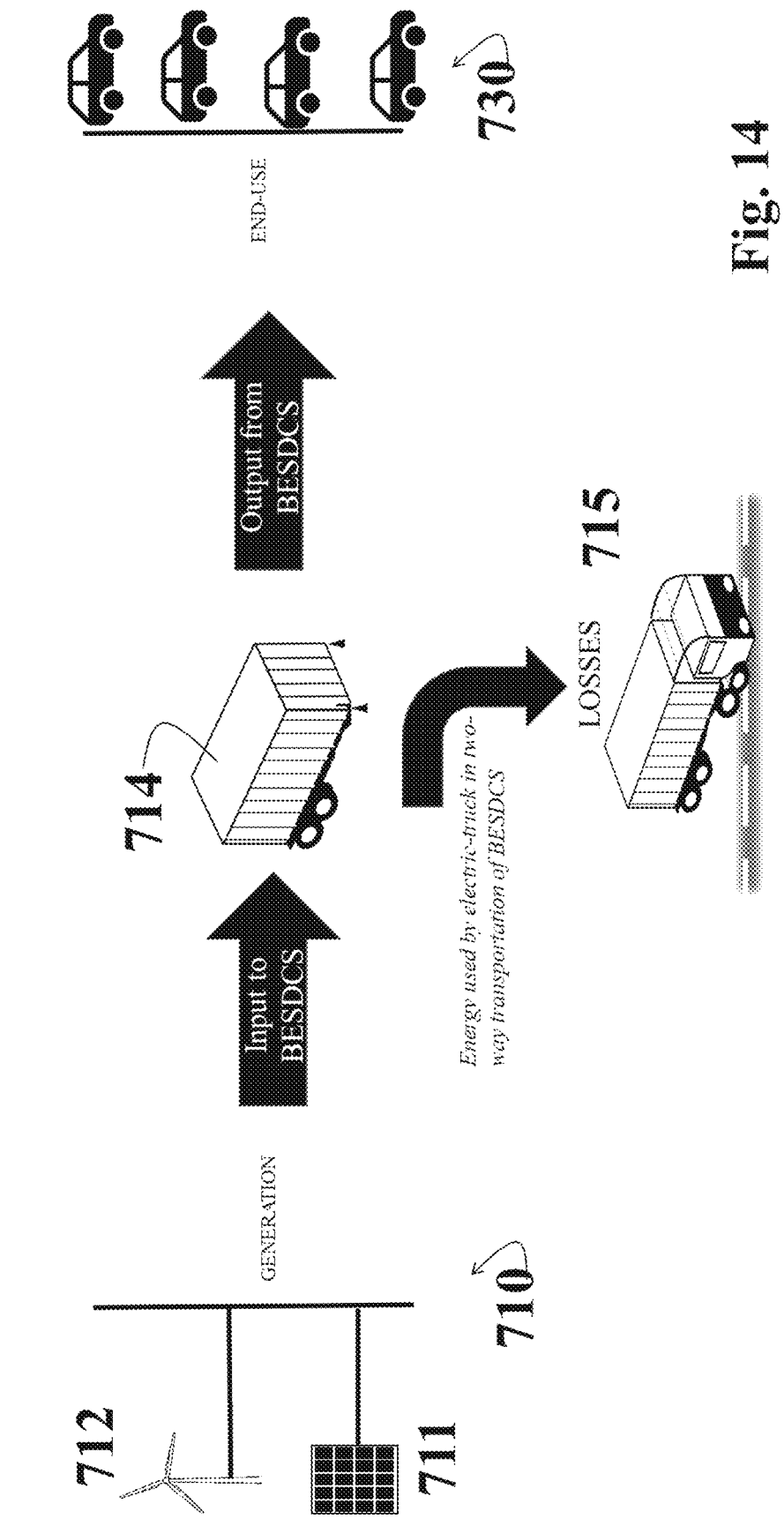
FIG. 14 illustrate a simple input-output energy diagram of battery energy storage DC system (BESDCS), in accordance with the disclosure.

FIG. 14 illustrate a simple input-output energy diagram of BESDCS 714.

The main input energy to BESDCS 714 is from Solar or Wind at DC-PGS 710, and the main output energy is charging energy for EVs at DC-CIS 730. The stored electric energy inside the BESDCS 714 (i.e. inside the batteries installed in the BESDCS 714) is also used for two-way transportation of BESDCS 714: from DC-PGS 710 to DC-CIS 730 and vice-versa. As an example—if the installed capacity of batteries (not shown in FIG. 14) inside BESDCS 714 is 1,000 kWh and energy consumed (mostly a direct function of distance between DC-PGS 710 and DC-CIS 730) by electric-truck 716 during transportation (two-way) is 100 kWh, then energy available for charging EVs 735 is 900 kWh—resulting in round-trip efficiency of 90%. Therefore, DC-PGS 710 and DC-CIS 730 are strategically located to reduce the losses in round-trip of electric tanker 715.

Figure 15:
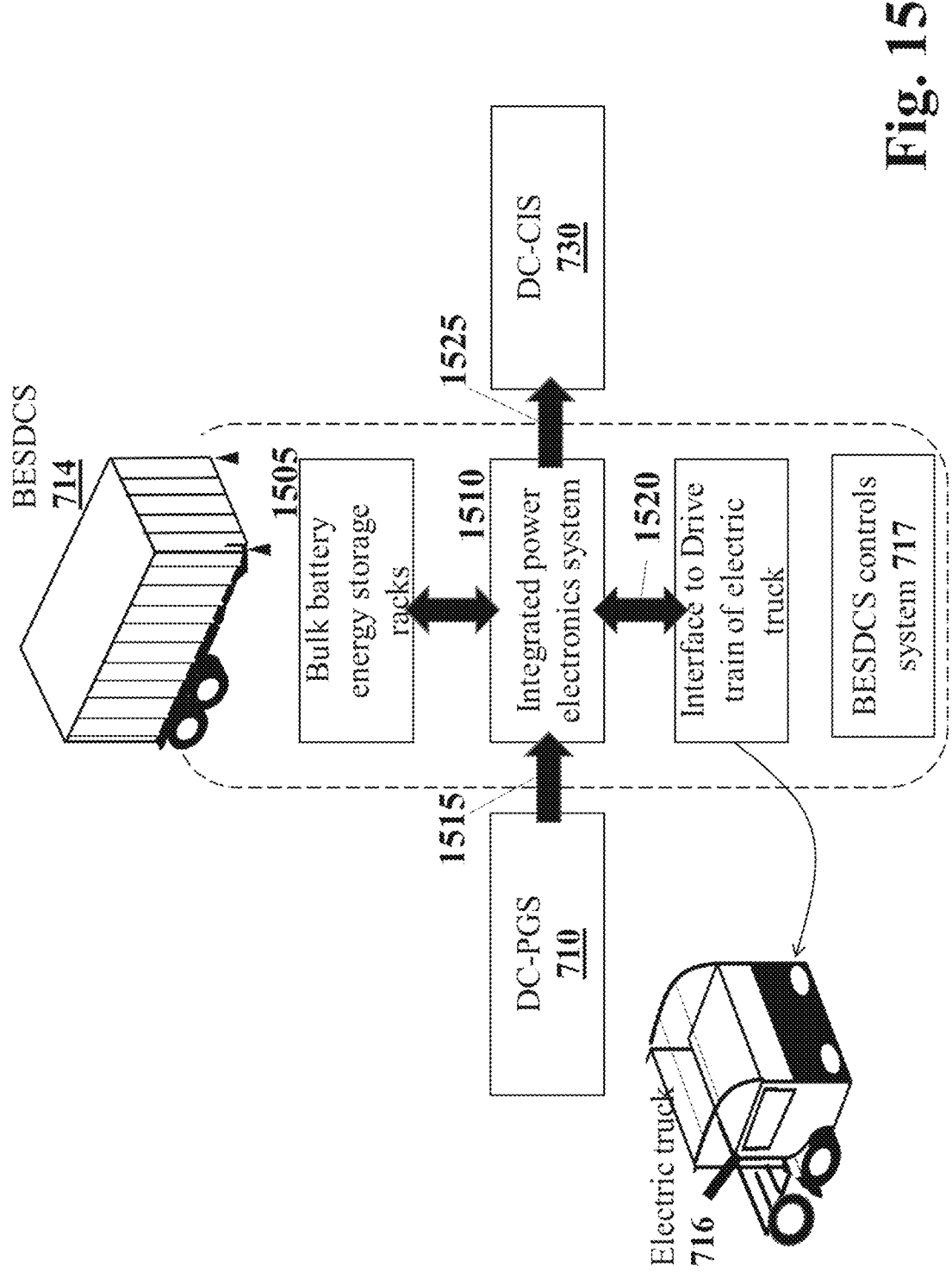
FIG. 15 is a block diagram to illustrate an embodiment of the BESDCS, presenting main components, interfaces and functionalities of a BESDCS, in accordance with the disclosure.

FIG. 15 is a block diagram to illustrate the details of an embodiment of the BESDCS 714. The two main components in BESDCS 714 are:
  a) Bulk battery energy storage racks 1505, which is made up of many small battery energy storage modules (not shown in FIG. 15) with their own battery management system (BMS) well known in the art; and
  b) Power electronics systems 1510, which connects battery energy storage racks to other main components of the ZE-EVC system 700 such as DC-Solar 711 or Wind 712 in DC-PGS 710 (via coupling element 1515), Electric truck 716 (via coupling element 1520) and EVs 735 in DC-CIS 730 (via coupling element 1525). From hereinafter, the power electronics system will be referred as Integrated power electronics system (IPES) 1510.

There are three main operating modes of BESDCS 714, as an exemplary embodiment:
  1) DC storage mode: In this mode, the DC power from DC-PGS 710 is stored in the battery energy storage racks 1505. Referring to FIG. 9B, the IPES 1510 of the BESDCS 714 is configured to provide functionality of a DC/DC converter to perform MPPT operation (using controls system 717 with methods well known in the art) for Solar arrays 711 and Charge control operation (using controls system 717 with methods well known in the art) for battery racks 1505 simultaneously. Referring to FIG. 10A, if the DC-PGS 710 include DC/DC converter 1002 then the IPES 1510 is configured to provide direct connection of Solar arrays 711 to battery energy storage racks 1505 via the coupling element 1515. The coupling element (details not shown in FIG. 15) can be a simple DC cable, fuses, connectors etc. well known in the art. Referring to FIG. 10B and the discussion in above with reference to FIG. 10, if the DC-PGS 710 include a partial x % DC/DC converter 1052 then the IPES 1510 is configured to provide functionality of the remaining (100–x %) DC/DC converter, and provide connection of Solar arrays 711 to battery energy storage racks 1505 via the coupling element 1515 and the IPES 1510. The same concept is applicable for coupling of BESDCS 714 with DC-PGS 710 comprising wind power plant as shown in FIG. 12 B, to illustrate another exemplary embodiment.
  2) EV charging mode: In this mode, the stored energy in the BESDCS 714 is used to charge EVs 735 at the DC-CIS 730. The IPES 1510 is configured to provide functionality of a DC/DC converter that performs discharging (using controls system 717 with methods well known in the art) of battery energy storage racks 1505 and simultaneously performs charging of EVs 735. The IPES 1510 provides multiple output connection interfaces (via the coupling element 1525) to connect multiple EVs 735 (more details to follow in the subsequent sections). Overall, the IPES 1510 transfers the charge from bulk energy storage racks 1505 of BESDCS 714 to the battery of EVs 735 by DC/DC charge controls methods well known in the art.
  3) Electric tanker mode: In this mode, the electric-truck 716 is powered by the stored energy in the battery energy storage racks 1505 when BESDCS 714 is coupled to electric-truck 716 for towing. In other words, the BESDCS 714 provides power to electric truck 716 to transport itself from one location to another. Conventional electric-truck includes an electric drive-train (i.e. electric motor, gearbox, shaft etc.), a battery pack (similar to that of an EV) and power electronics that charges the battery pack from an external power source and then uses the stored energy to supply power to electric drive train to move the truck. In an exemplary embodiment, in the electric-truck 716 for transporting BESDCS 714, the rating of power electronics and battery pack is very small (auxiliary battery pack), just enough to move the electric-truck 716 when not coupled to BESDCS 714 i.e. electric-truck 716 without any load. Once the BESDCS 714 is installed on electric-truck 716 for towing/transportation, the IPES 1510 provides the rated power to move the truck with its GVW (gross vehicle weight) of 80 ton as an example. The IPES 1510 draws power (and supply to the drive train of electric truck 716) from bulk battery energy storage racks 1505 inside BESDCS 714 during transportation between DC-PGS 710 and DC-CIS 730 of the ZE-EVC system 700.

While main modes of operation as an embodiment have been presented above, it is apparent that many additional secondary modes may exist and introduced without departing from the spirit and scope of the key concept. For example, the IPES 1510 can be connected to an external power source to charge the battery storage racks in the event of a breakdown, a situation in which the stored energy inside BESDCS 714 is completely lost, or the stored energy inside the battery pack of electric-truck 716 is completely lost. In such scenario, the IPES 1510 can accept power from an external source to charge the BESDCS 714, just enough to reach to a nearby DC-PGS 710 for full charging operation. Alternatively, the battery storage racks 1505 of BESDCS 714 can directly accept power from a DC external source. Likewise, some of the balance of system components well known in the art such as thermal management system (liquid cooling, forced air cooling etc.) to extract heat out of battery energy storage racks 1505 and IPES 1510 during charging and discharging operation is not illustrated in FIG. 15.

Figure 16:
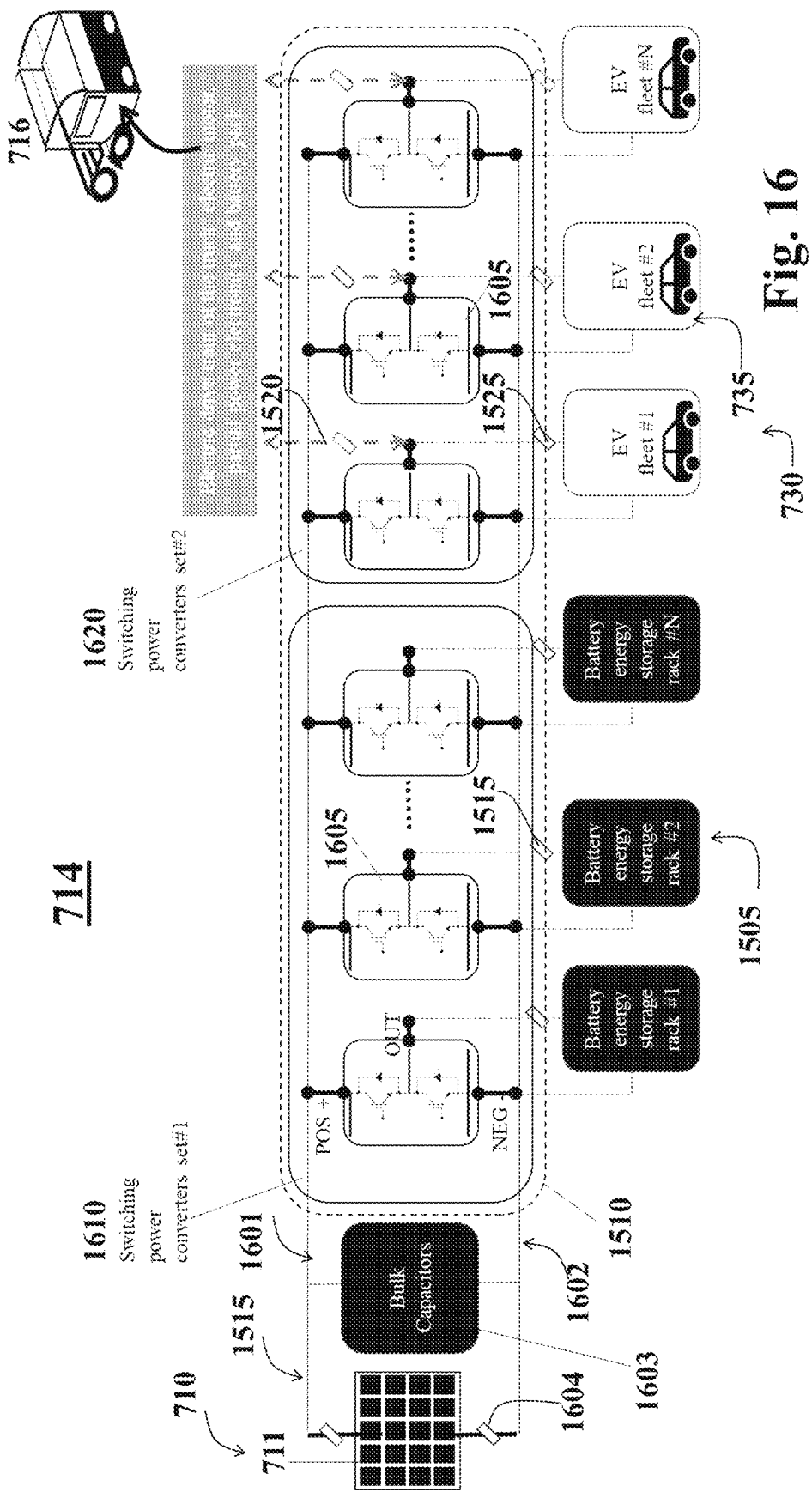
FIG. 16 illustrates an embodiment of BESDCS, in accordance with the disclosure.

FIG. 16 provides further schematic details of the IPES 1510 of the BESDCS 714, as an exemplary embodiment. The IPES 1510 includes DC terminals POS+ 1601 and NEG– 1602 with a capacitor 1603 between the terminals. Many switching power converters 1605 (well-known in the art) are connected to common DC POS+ 1601 and NEG– 1602 terminals. These group of power converters 1605 is referred as switching power converter set #1 1610. The solar arrays 711 of the DC-PGS 710 for example can be coupled to the power converter set #1 1610 of the IPES 1510 via the coupling element contactor and cables 1604. The switching power converter set #1 1610 establish a DC voltage at the terminals 1601 and 1602 voltage (while performing MPPT function) such that solar arrays 711 generate maximum power for a given environmental conditions (such as ambient temperature, humidity and solar irradiance); The same switching power converter set #1 1610 #1 . . . N performs the charging of battery energy storage racks 1505 via the coupling element 1515 which can be electrical components such as fuse, cable, filter, dc pre-charge circuit etc. well known in the art.

Many circuit configurations to realize switching power converter set 1610 are possible to store power from solar arrays 711 into a battery energy storage 1505; e.g. many inputs from solar arrays 711 can be connected to a group of switching power converters charging different battery system without any common DC link. The battery energy storage can have their own separate, and common DC link. The schematic details shown in FIG. 16 (including the details of switching power converter) is not meant to include all conventional features and possibilities known by those of ordinary skill in the art to be required for the practice of the disclosure.

In another embodiment, referring to FIG. 16, another switching power converters (set #2) 1620 is connected to the same DC link as set #1 1610, whereas, the outputs of set #2 1620 supply power to charge EV battery (via coupling elements 1525) in one of the operating modes as described above with reference to the main operating models of BESDCS 714. In this operating mode, power from battery storage racks 1505 is drawn by converters set #1 1610 and used to charge EVs 735 by converters set #2 1620. The same power converter set #2 1620 can be used to supply power to electric drive train (not shown in FIG. 16) of the electric truck 716 of the electric-tanker transport system 750. The converter set #2 doesn't conflict with EV charging operation since EVs are not charged when the electric-tanker 715 (i.e. electric-truck 716 coupled with BESDCS 714) is substantially moving in transit from DC-PGS 710 and DC-CIS 730 and vice versa. In the illustration of the details of IPES 1510 in FIG. 16, power converter sets (1610 and 1620) are used to present an exemplary embodiment in that how power converter sets (1610 and 1620) are used to perform charge and discharge operation of the battery racks 1505 inside BESDCS 714 for storing power from solar arrays 711 and for charging EVs 735. The main idea, as an exemplary embodiment, is that group of power converter sets of IPES 1510 can be configured or re-configured to perform multiple operation such as explained above in that set #2 1620 is used to charge EV 735 as well as used to provide power to electric drive train of electric truck 716.

Figure 17:
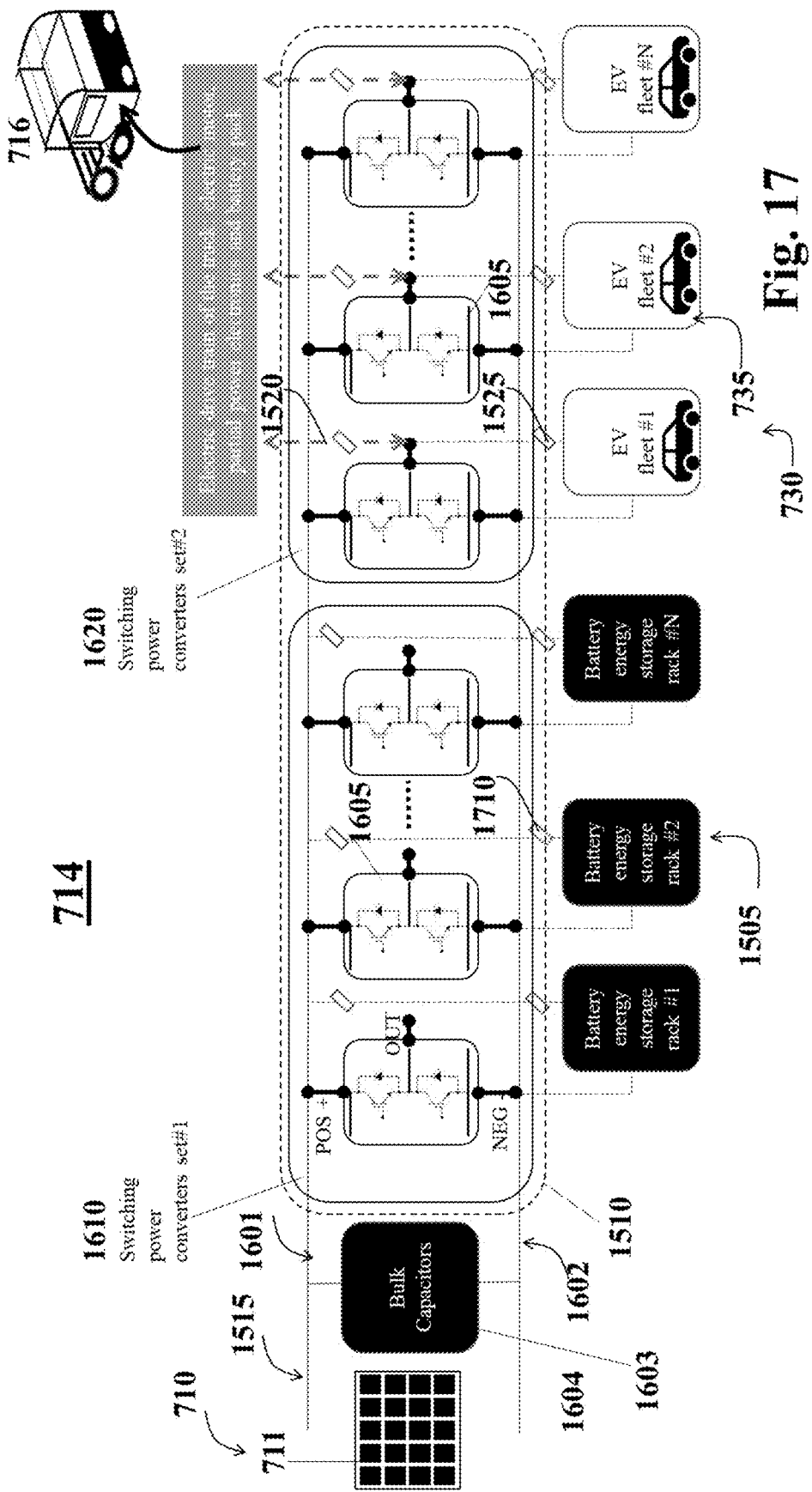
FIG. 17 is yet another embodiment of BESDCS to charge EVs from battery storage racks inside the BESDCS when the same racks are not charged from solar or wind.

FIG. 17 presents yet another exemplary embodiment to charge EVs 735 from battery storage racks 1505 inside the BESDCS 714 when the racks 1505 are not charged from solar arrays 711. Under this condition, the peak power rating of the IPES 1510 to charge the EV battery can be increase as follows: When Solar arrays 711 are not charging the battery energy storage racks 1505, the switching power converters of set #1 1610 and set #2 1620 can be combined together to increase the net output power rating of IPES 1510 to provide more power for EV charging via the coupling element 1525. In other words, more number of EVs 735 can be charged simultaneously because both power converter sets 1610 and 1620 are coupled together to perform power conversion and hence increase the output power capability of IPES 1510 for charging EVs. The battery storage racks 1505 can be directly connected to the DC terminal 1601 and 1602 as shown in FIG. 17 via a separate coupling element 1710 which is different than the coupling element 1515 in FIG. 16). The voltage matching between bulk capacitors 1603 and battery storage racks 1505 are performed prior to connecting battery storage racks 1505 to the same DC terminals 1601 and 1602. Note that auxiliary circuits and details to realize the method are not shown for brevity since they are very well known in the art.

Likewise, when the electric tanker 715 is moving, since the converter set #1 1610 is not used to charge the battery racks 1505, the set #1 1610 can be combined to set #2 1620 to increase the rating of peak power delivery capacity to electric drive train of the electric truck 716.

Figure 18:
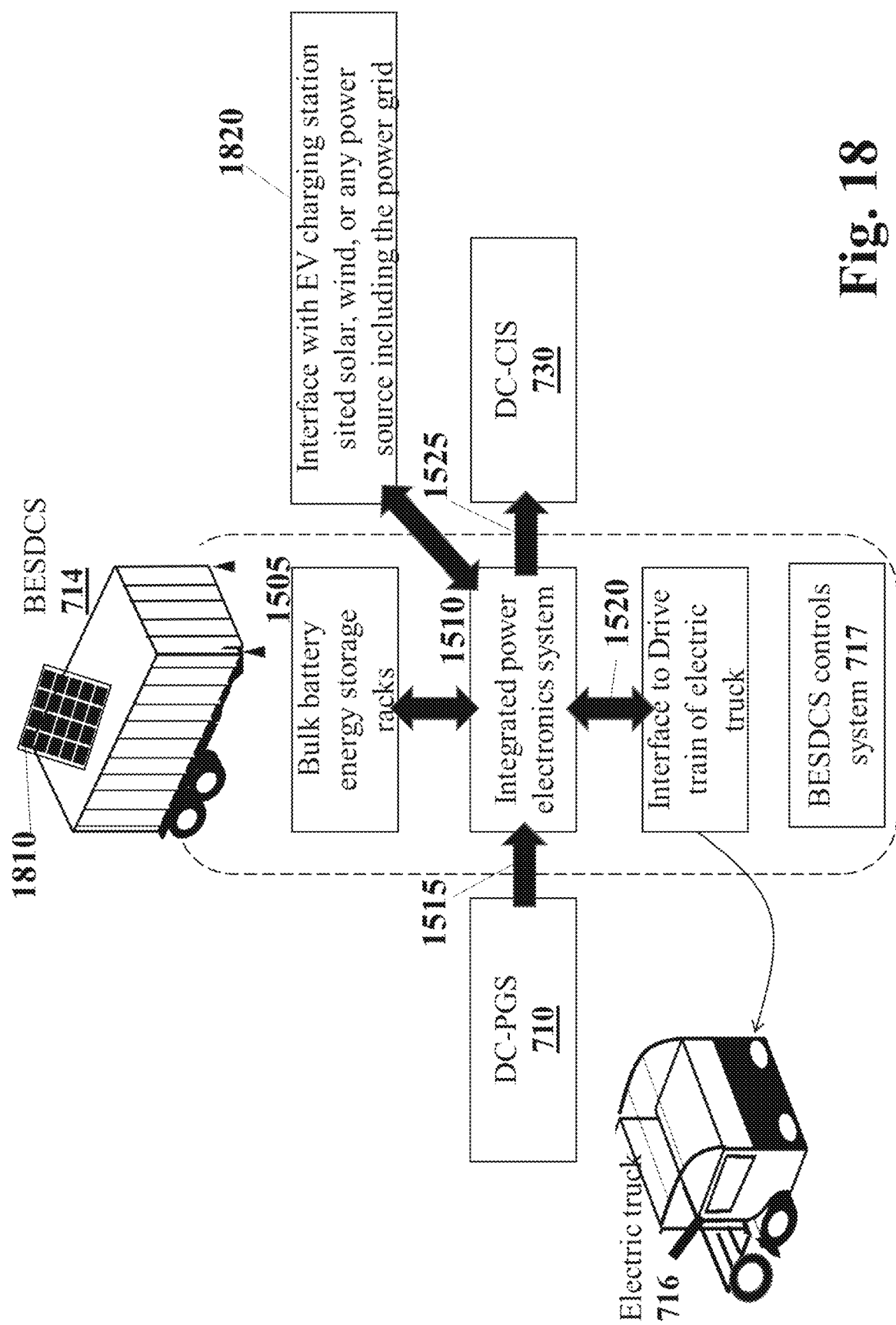
FIG. 18 illustrate yet another aspect of disclosure in which the integrated power electronics system (IPES) inside BESDCS can accept energy from solar arrays installed in the DC-CIS or on the roof of BESDCS, in order to charge the battery energy storage racks to compensate for losses during transportation.

FIG. 18 illustrates yet another embodiment in which the IPES 1510 can accept energy from solar arrays installed in the DC-CIS 730 or on the solar array 1810 on the roof of BESDCS 714, in order to charge the battery energy storage racks 1505 to compensate for energy consumed by electric-truck 716 during transportation of BESDCS 714. Without any limitation, the battery storage racks 1505 inside BESDCS 714 can be charged from any other power source via coupling interface 1820 to compensate for the energy consumed by electric drive train of the electric truck 716 during transportation of BESDCS 714, or during EV charging operation when at DC-CIS 730.

Figure 19:
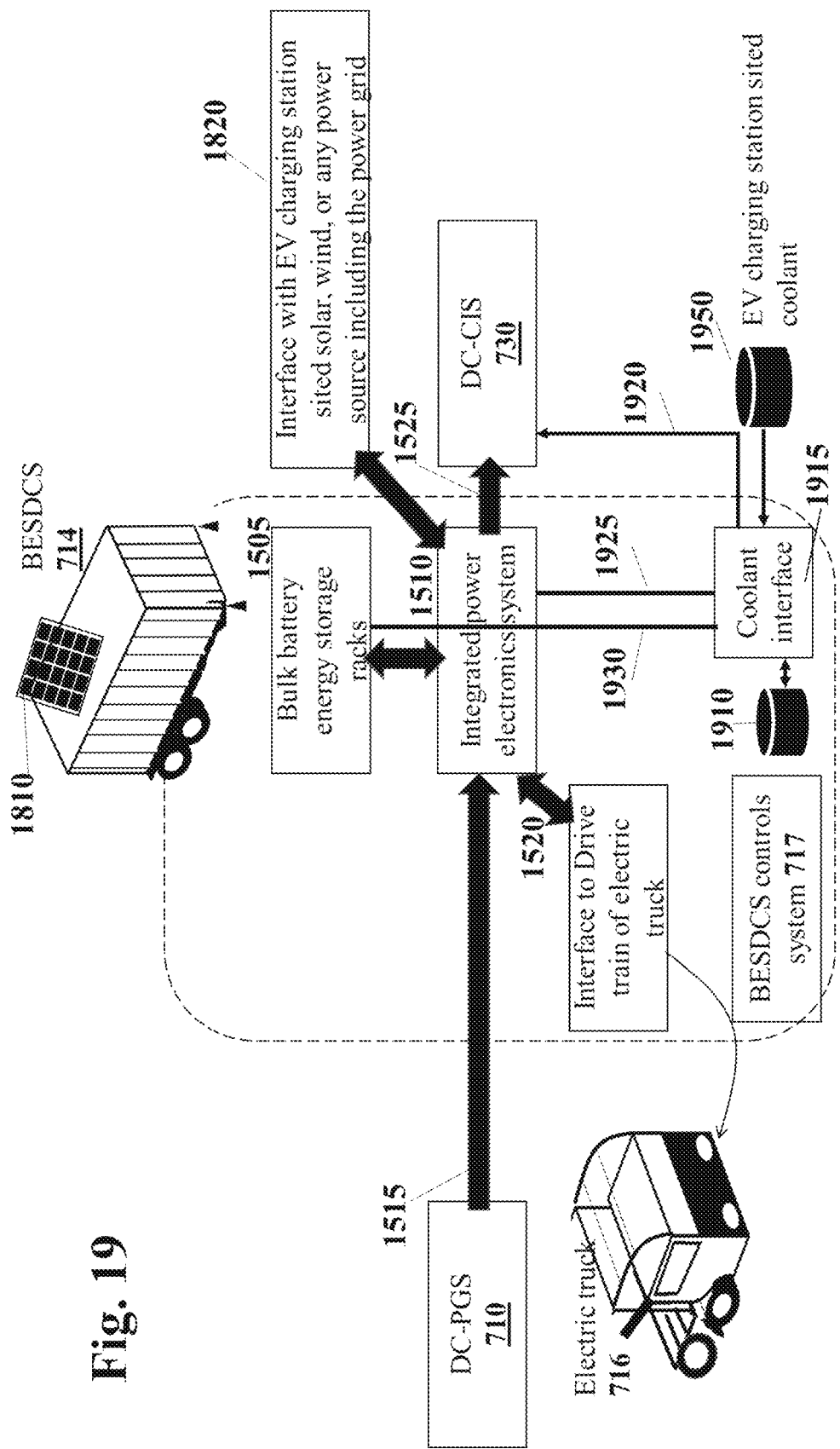
FIG. 19 illustrate yet another aspect of disclosure in which the BESDCS includes a coolant liquid storage.

FIG. 19 illustrates yet another embodiment in which the BESDCS 714 further includes a coolant liquid storage 1910. This coolant can be supplied directly to EVs 735, battery energy storage racks 1505, IPES 1510, via cooling interface element 1915 (which can be as simple as a simple container with plumbing network well known in the art), for thermal management method which is also well known in the art, when BESDCS 714 performs DC fast charging operation (i.e., supplying very high power to one of those EV charging outlets via coupling element 1525). It is also well known in the art that if very fast charging of EV is performed (200 kW+ power to one EV battery pack), in future, the cable and connector system along with the battery packs inside EV will generate large amount of heat beyond the management capacity of existing technologies. The liquid or gas coolant 1910 inside BESDCS 714 connects to EVs 714 through another parallel channel 1920 (whether embedded with coupling element 1525, not shown in FIG. 19 or through separate coupling element 1920, for thermal management during DC charging. Likewise, separate coupling element 1925 and 1930 is provided as an exemplary embodiment to provide thermal management of the battery energy storage racks 1505 and IPES 1510. In yet another exemplary embodiment, a coolant storage tank 1950 comprising gas or liquid to provide thermal management is installed at the DC-PGS 710 or DC-CIS 730. As an exemplary embodiment, BESDCS 714 further include a coupling interface 1960 to externally sited coolant storage tank 1950.

In the subsequent paragraphs, a detailed description of DC-CIS 730 is provided as exemplary embodiments and description of prior-art is also provided.

Figure 20:
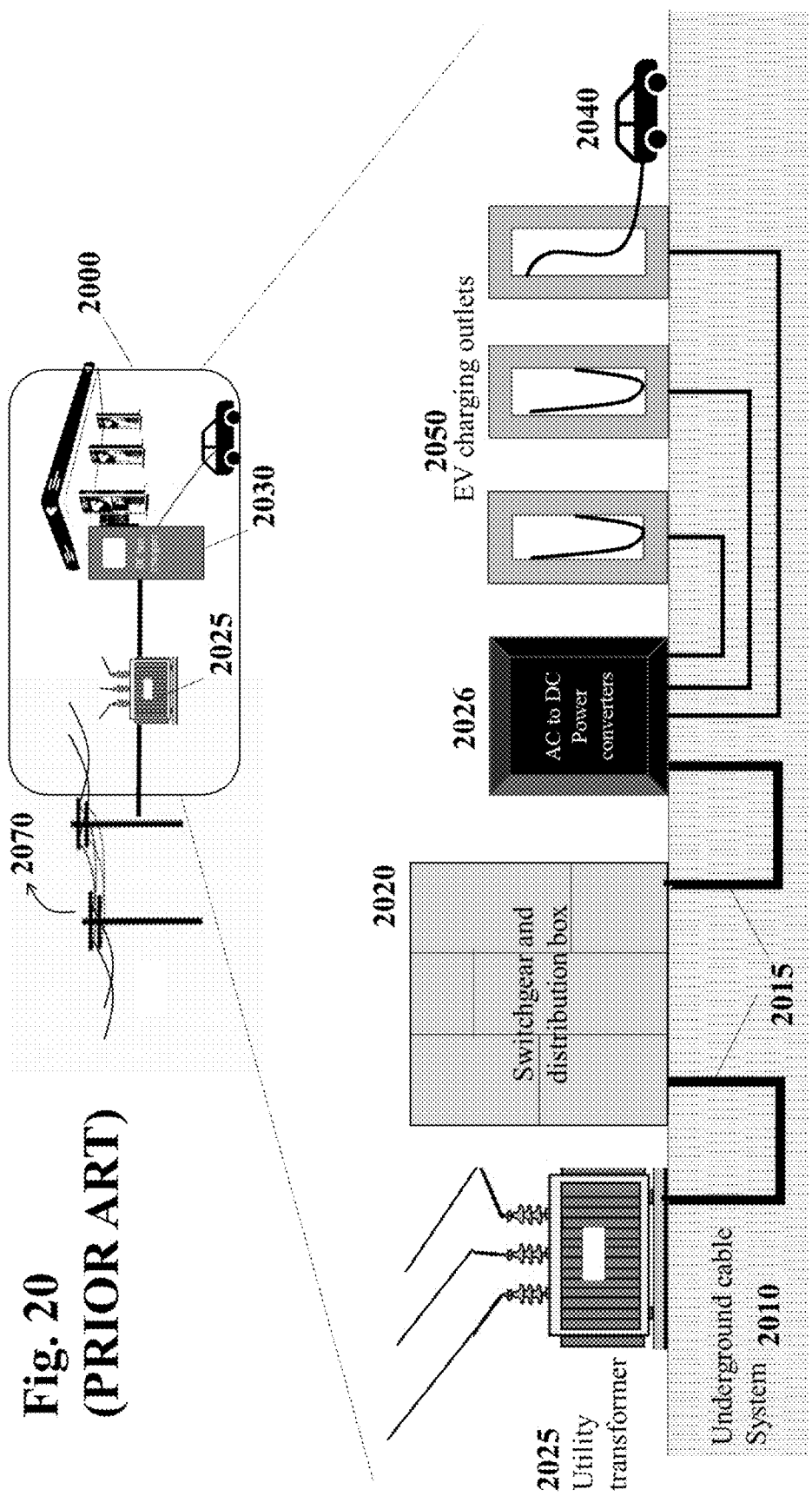
FIG. 20 shows a prior-art schematic of DC charging station.

FIG. 20 is a detailed diagram of DC charging station 2000 as prior-art. Massive underground trenching 2010, cable system 2015 and switchgear boxes 2020 are essential components in DC charging station 2000. A step-down utility grade transformer 2025 provides the necessary isolation and voltage scaling for AC to DC converters 2026 of the DC fast charger 2030 of the DC charging station 2000. The AC to DC converters 2026 control the charging of EV connected & parked at respective charging outlets. Depending on the state of charge of batteries (not shown in FIG. 20) of EVs 2040, one EV battery (essentially same as the battery pack, not shown in FIG. 20, inside one of the EV 2040) may receive higher charging power compared to other EV batteries. Let's consider an example: 3 EVs are parked with SoC (state of charge) of respective EV battery as 10%, 50% and 70%. The charging power assigned (as an example) to EV-1 with 10% SoC can be 60%, to EV-2 with 50% SoC can be 30% and the remaining 10% charging power is assigned to EV-3. As the SoC of EV batteries change, the controller inside AC to DC converters 2026 allocates appropriate power to respective EV charging outlets 2050.

It can be observed that as the number of EV charging outlets 2050 is increased to host more EVs 2040 for charging at the DC charging station 2000, the number of AC to DC power converters 2026, size of associated switchgear 2020 and the size of utility transformer 2025 will have to be increased in proportion, resulting in very heavy infrastructure and higher peak power demand from the Utility power distribution network 2070.

Figure 21:
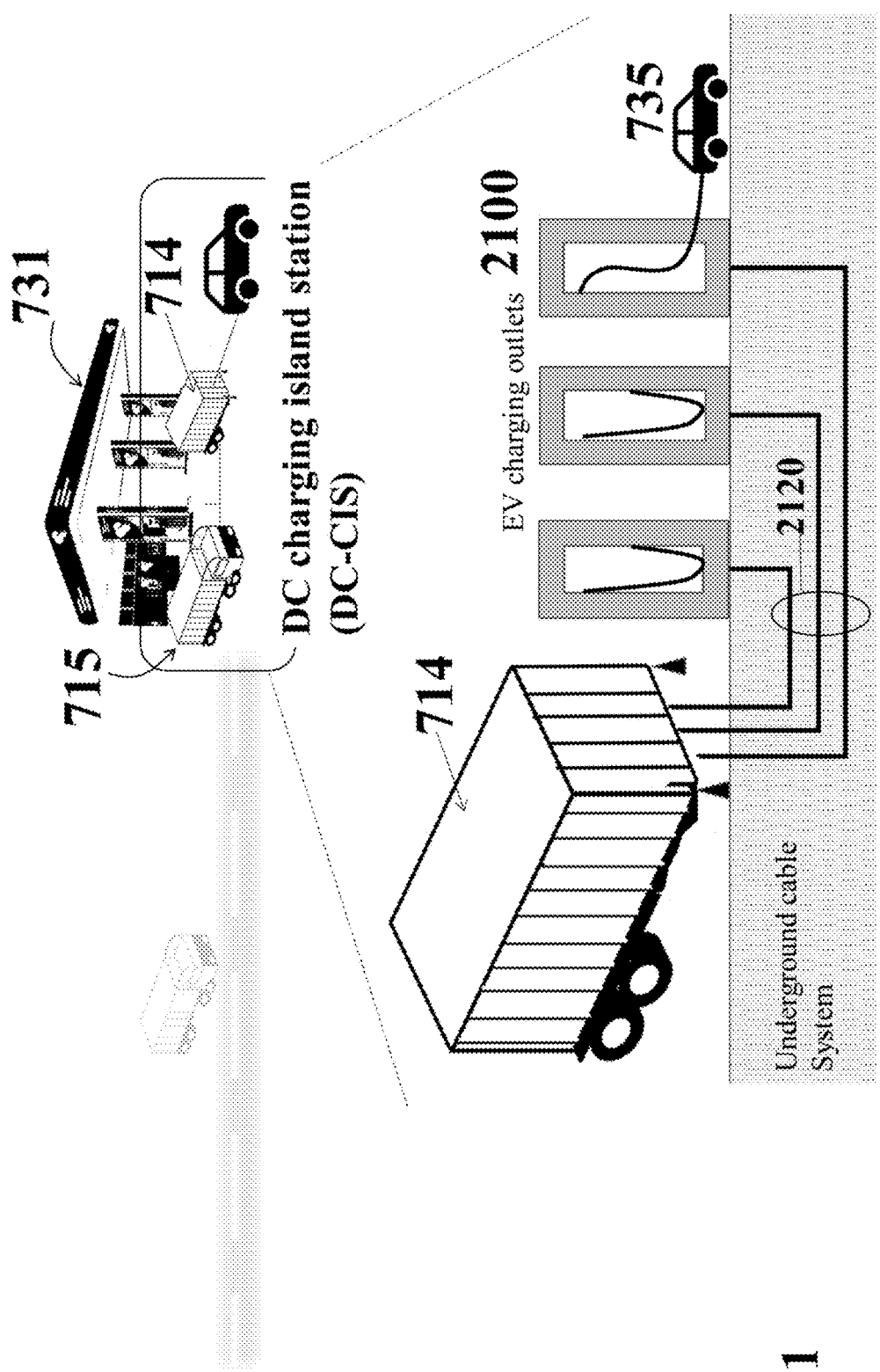
FIG. 21 illustrates an embodiment of the DC charging station, in accordance with the disclosure.

FIG. 21 is a detailed diagram of the DC-CIS 730, as another exemplary embodiment. The BESDCS 714, with its own IPES 1510 (Referring to FIG. 15), can directly provide power to EV charging outlets 2100. The power converters of IPES 1510 in BESDCS 714 assigns power to respective EV charging outlets 2100, based on the state of charge of respective EVs 735. Let's consider an example: A BESDCS 714 is configured with 4,000 kWh of battery storage rack 1505 and 2,000 kW of IPES 1510. At a given time, 10 EVs are parked for charging at the DC-CIS 730. With 2,000 kW of power capacity of IPES 1510, each of the 10 EVs can be assigned 200 kW peak charging power by configuring power converter sets #1 1610 and set #2 1620. Depending on the state of the charge of batteries inside EVs, one of the EV can be assigned peak charging power in the order of 1,000 kW which is well beyond what EVs can accept in foreseeable future. The example given above provides just an illustration of how BESDCS 714 can be configured to charge a number of EVs while capable of providing high power for DC fast charging in less than 15 mins.

It can be observed that by hosting more number of BESDCS 714 at DC-CIS 730 via electric-tanker transport system 750, seamless scalability (to host more number of EVs at any given time, replicating gas-station like infrastructure) of DC-CIS 730 can be achieved without impacting any utility power distribution grid.

Figure 22:
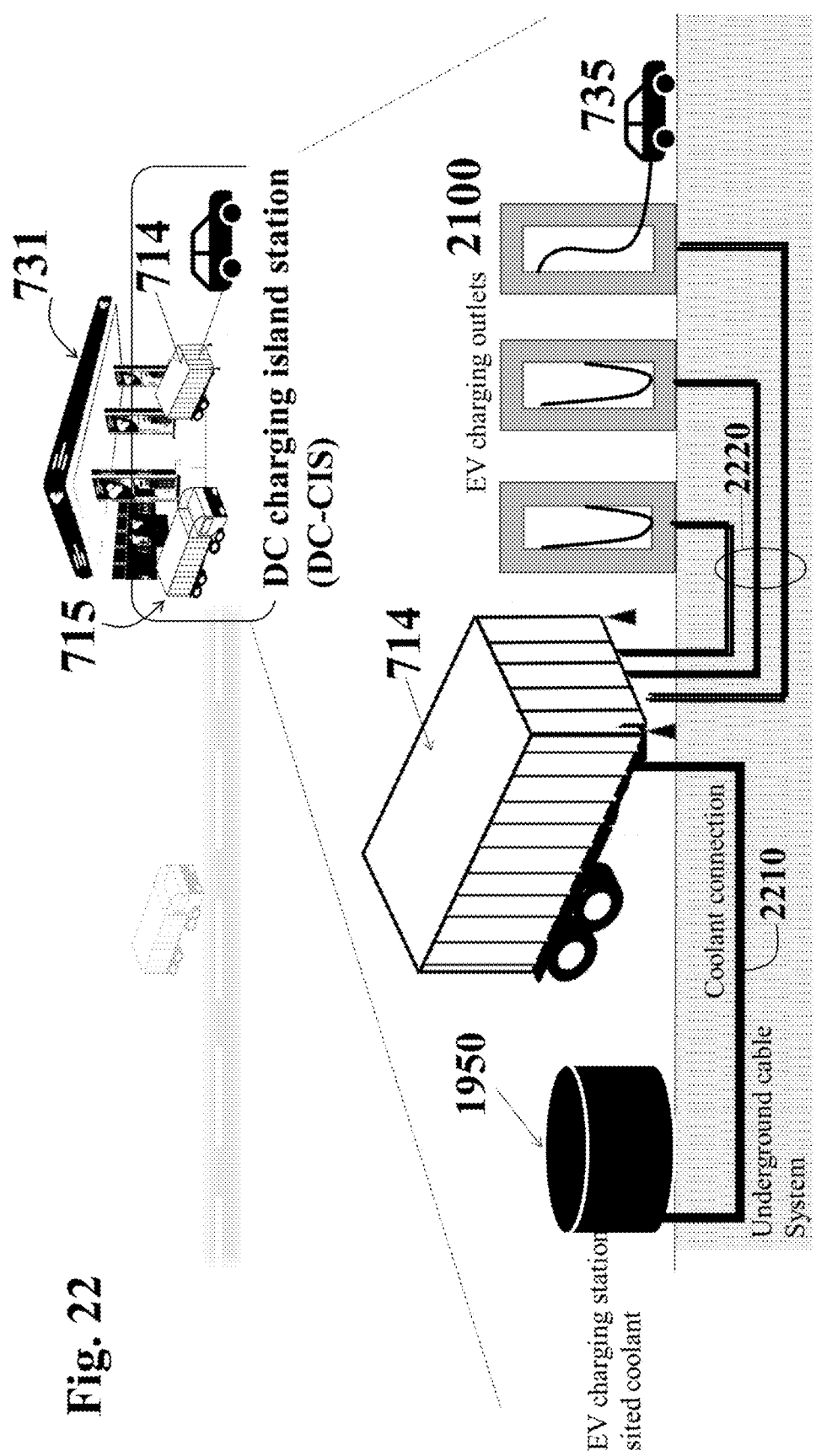
FIG. 22 illustrates yet another embodiment of the DC charging station, including a coolant system, in accordance with the disclosure.

FIG. 22 is a detailed diagram of the DC-CIS 730, as yet another embodiment, in which DC-CIS 730 further includes a coolant storage tank 1950 that is configured to be coupled to BESDCS 714 via coupling element 2210 that provide coolant flow path. The BESDCS 714 is further configured to be coupled to EV charging outlets 2100 via another coupling element 2220 that can facilitate both power and liquid coolant flow to the EV charging outlets 2100, which in turn route the coolant to EV charging outlets. In fast DC charging mode in which much higher charging power is used to charge in EV in few minutes, the coolant stored in coolant tank 1950 can be used for thermal management of cable systems 2220 between BESDCS 714 and EV charging outlets 2100; The coolant can also be used to aid thermal management of EV battery in such mode known in the art.

Figure 23:
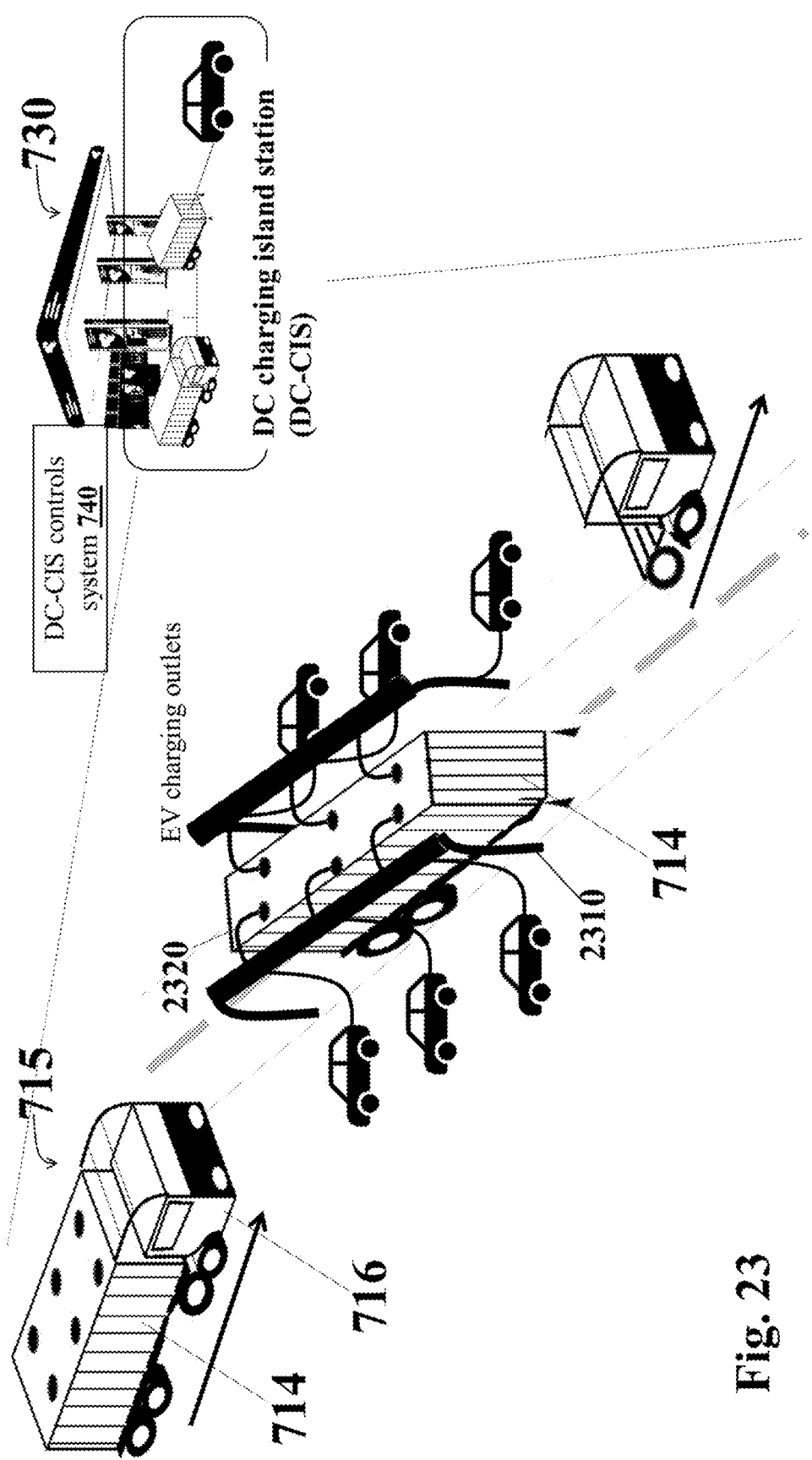
FIG. 23 illustrates a detailed diagram of electric truck & BESDCS logistics and EV charging outlets, as yet another embodiment of DC charging station, in accordance with the disclosure.

FIG. 23 is a detailed diagram of electric tanker 715 (essentially BESDCS 714 coupled with electric truck 716) and the logistics of electric-tanker transport 750, as yet another embodiment of DC-CIS 730. A method to use DC-CIS 730 as a further exemplary embodiment is now explained: Electric-tanker 715 enters the DC-CIS 730; BESDCS 714 is decoupled from electric-truck 716; BESDCS 714 is then coupled to EV charging outlets 2310 via the coupling elements 2320 (which can be essentially same as 2220 or 2120), with multiple input outputs connection as shown with above ground power cable system 2325; Thereby, BESDCS 714 establishes direct connections to EVs 735. The electric-truck 716 (now decoupled from BESDCS 714) then drives itself to pick-up another BESDCS 714 that need charging; the power to drive electric truck 716 comes from a small auxiliary battery pack (not shown in FIG. 23, however, well known in the art), and a low-power rated drive train within electric-truck 716. Once the electric truck picks up the BESDCS 714 (in other words when BESDCS 714 is coupled with electric truck 716) that need charging, the power to drive the electric truck 716 comes substantially from BESDCS 714. It is important to recognize that there is always some energy left in the battery energy storage racks 1505 of the BESDCS 714 (by design, as an embodiment of the method) so that BESDCS 714 can supply power to the electric-truck 716 for towing itself to the selected DC-PGS 710 of the ZE-EVC system 700.

Figure 24:
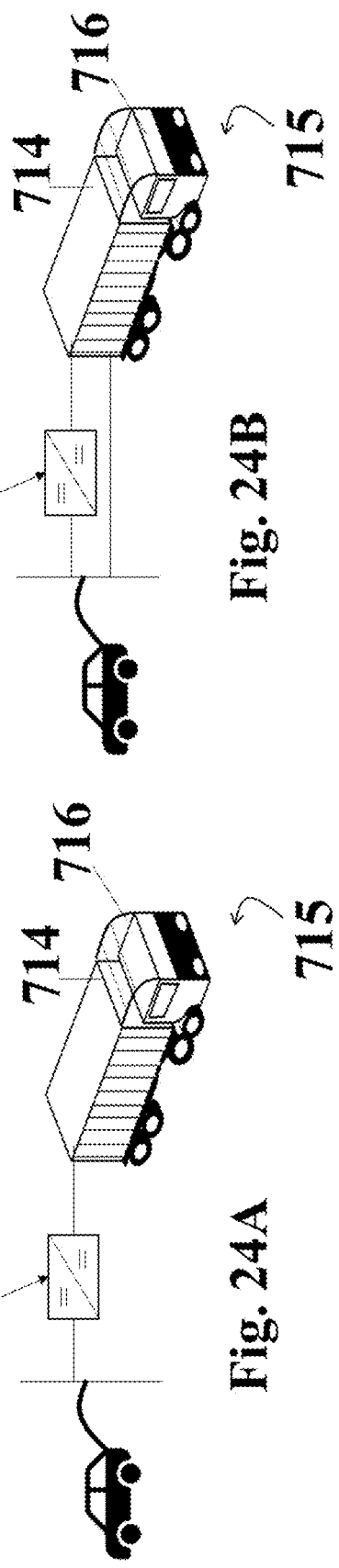
FIG. 24A illustrates yet another embodiment of DC charging station, comprising a full-power DC/DC converter installed outside of BESDCS.
FIG. 24B illustrates another embodiment of DC charging station, comprising a partial-power DC/DC converter installed outside of BESDCS

FIG. 24A presents a portion of DC-CIS 730 to illustrate another embodiment of the DC-CIS 730. DC-CIS 730 include DC/DC power converter 2410 to perform the EV charging operation. In this configuration of DC-CIS 730, the IPES 1510 of the BESDCS 714 is not used for charging EVs. Under this configuration, the power rating of converter sets #1 1610 and #2 1620 of the IPES 1510 can be reduced to advantageously reduces the overall weight and complexity of BESDCS 714 since the IPES 1510 does not include the power electronics to charge the EV battery, resulting in overall weight reduction of BESDCS 714, as another exemplary embodiment. Overall weight reduction of BESDCS 714 results in fewer energy loss during roundtrip transportation of BESDCS 714 between the selected DC-PGS 710 and DC-CIS 730 of the ZE-EVC system 700.

FIG. 24B presents a portion of DC-CIS 730 to illustrate another embodiment of the DC-CIS 730; DC/DC converter 2420 with fraction x % of total power capacity required to charge the EVs can be installed at DC-CIS 730, whereas the remaining (100−x) % capacity of DC/DC converter (not shown in FIG. 24B) can be installed as power converter sets (1610 or 1620) of IPES 1510 of BESDCS 714. This method advantageously achieves better integration: Within the weight limit of BESDCS 714, some capacity of DC/DC converter can be installed and integrated with IPES 1510, whereas DC/DC converter 2420 with remaining capacity is installed outside BESDCS 714 to achieve very high power EV charging.

Figure 25:
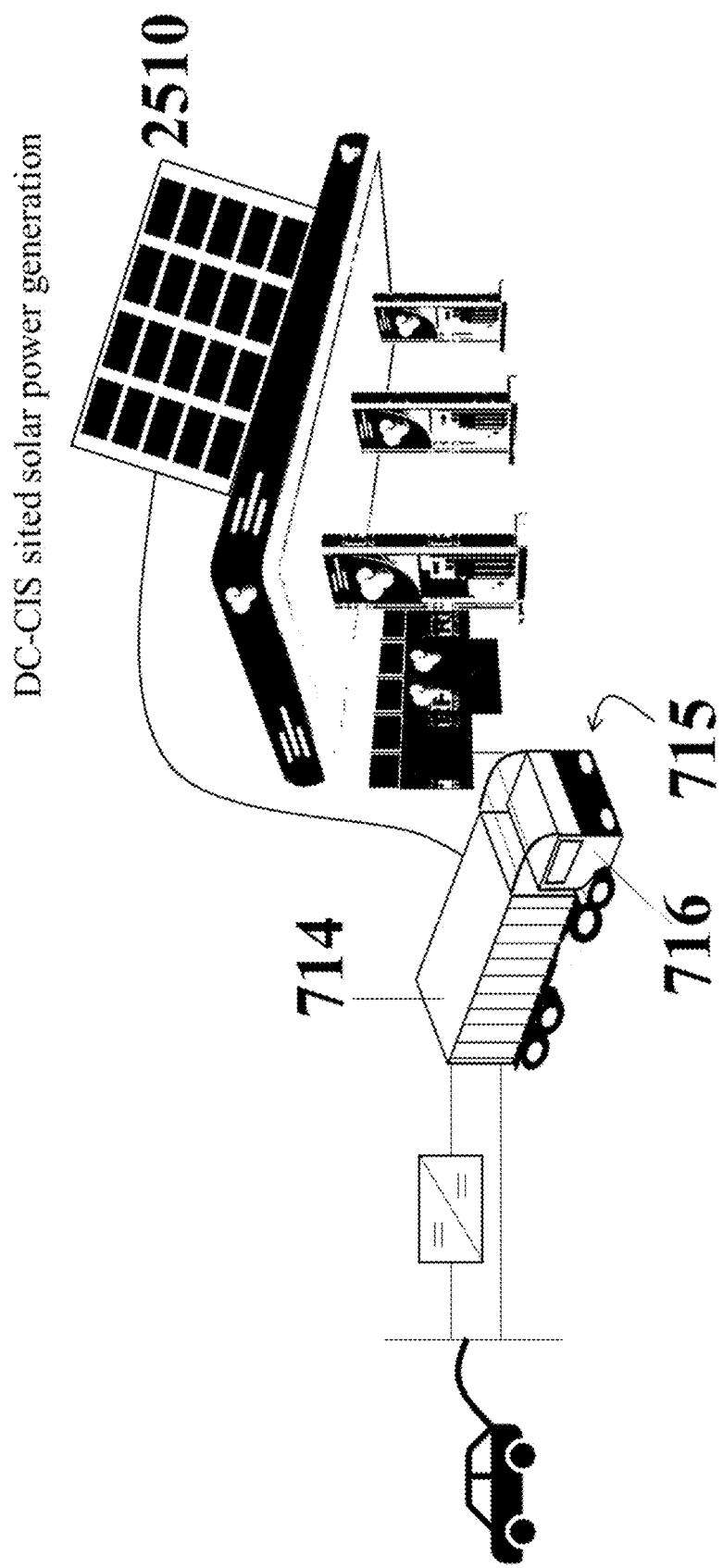
FIG. 25 illustrates yet another embodiment of DC charging station, indicating a method to charge BESDCS to compensate for the energy lost during BESDCS' roundtrip between renewable DC power supply station and DC charging station.

FIG. 25 is a yet embodiment of DC-CIS 730 illustrating a system to charge BESDCS 714, for compensating the energy lost (essentially same as energy consumed by electric truck 716) during the transport of BESDCS 714 from DC-PGS 710 and DC-CIS 730 and from the DC-CIS 730 to DC-PGS 710. DC-CIS sited solar array 2510 or any other power source (not shown in FIG. 25) is coupled to BESDCS 714 via coupling element 2520 to charge the battery storage racks 1505 inside BESDCS 714. A method is now presented to illustrated, as another exemplary embodiment, for charging the battery energy storage racks 1505 of the BESDCS 714 when the battery energy storage racks 1505 is fully discharged at the DC-CIS 730 due to abnormal operation or unexpected operation. In this situation, BESDCS 714 can't provide power to electric truck 716 for transport to DC-PGS 710. The BESDCS 714 is configured to be coupled to the DC-CIS sited solar array 2510 to be partially charged so that BESDCS 714 can provide power to the electric truck 716 for transport to DC-PGS 710. Without departing from the spirit of the exemplary embodiment, any other electrical sources (including power from Utility power distribution network)

can be used to provide power to fully discharged BESDCS 714. Alternatively, an electric-tanker 715 with charged BESDCS 714 can be dispatched by the electric-tanker transport system 750 to charge the fully discharged BESDCS 714 either at DC-CIS 730 or at any other location.

Special Notes on DC-CIS 730, its Definition, and its Use:

While various embodiments of the DC-CIS 730 have been briefly summarized, it is apparent that many modifications can be made without departing from the spirit and scope of present disclosure. For example, The DC-CIS 730 (FIG. 21-25) can be part of an existing gas station that is connected to the grid, or a bigger system with electrical system connected to the grid. Likewise, the system or the gas station with connection to grid, can supply electricity to electric truck in an event when its small auxiliary battery pack is discharged inadvertently.

Overall, the grid connected electric system can co-exist with DC-CIS 730, in which the grid is used as an auxiliary power supply and not used as main power supply for charging EVs.

Special Notes on Safety Around BESDCS 714:

Referring to FIG. 23, without any limitation, other aspects of applications such as installation safety, human safety etc. are incorporated when dispensing energy from BESDCS 714 to EV 735. Although not shown in FIG. 23, a safety cage around BESDCS 714 can be built and an interlock system can be realized in order to avoid any shock hazard or fire hazard. The block diagram shown in FIG. 23 is not meant to include all conventional features and possibilities known by those of ordinary skill in the art to be required for the practice of the disclosure.

Figure 26:
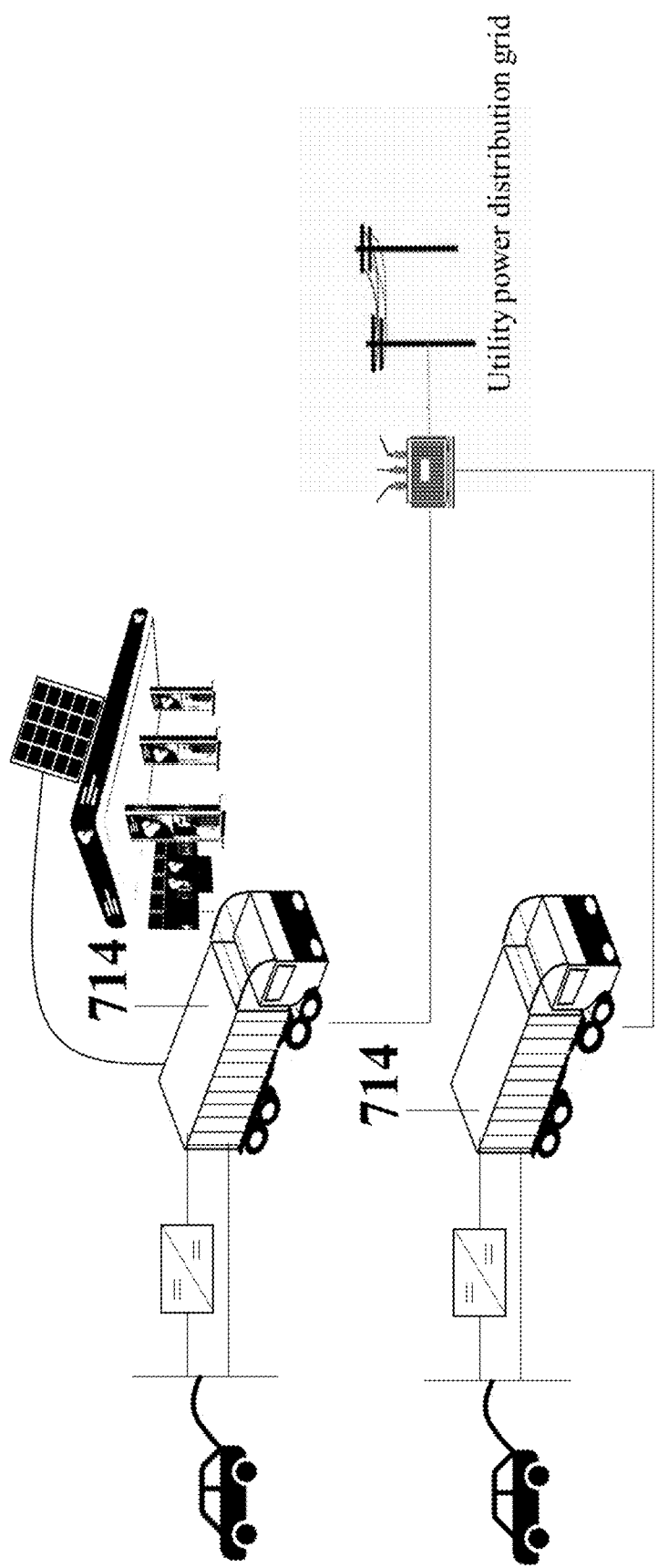
FIG. 26 illustrates an embodiment of DC charging station with BESDCS to support power distribution grid on a need basis, outside the scope of ZE-EVC system, in accordance with the disclosure.

FIG. 26 is an aspect of DC-CIS 730 and BESDCS 714 to support power distribution grid on a need basis. The DC-CIS 730 can act like a distributed energy resource (DER) to the grid, performing various function such as demand-response, peak capacity resource etc well known in the art. In another aspect, when BESDCS 714 is performing EV charging operation, the IPES 1510 can also be integrated with grid with an isolation transformer to perform various DER functions. Alternatively, IPES 1510 can be completely bypassed and the energy storage racks 1505 inside the BESDCS 714 can be directly integrated with the grid with an inverter and transformer as shown in FIG. 26 to provide services such as back-up power to the grid 2610.

Figure 27:
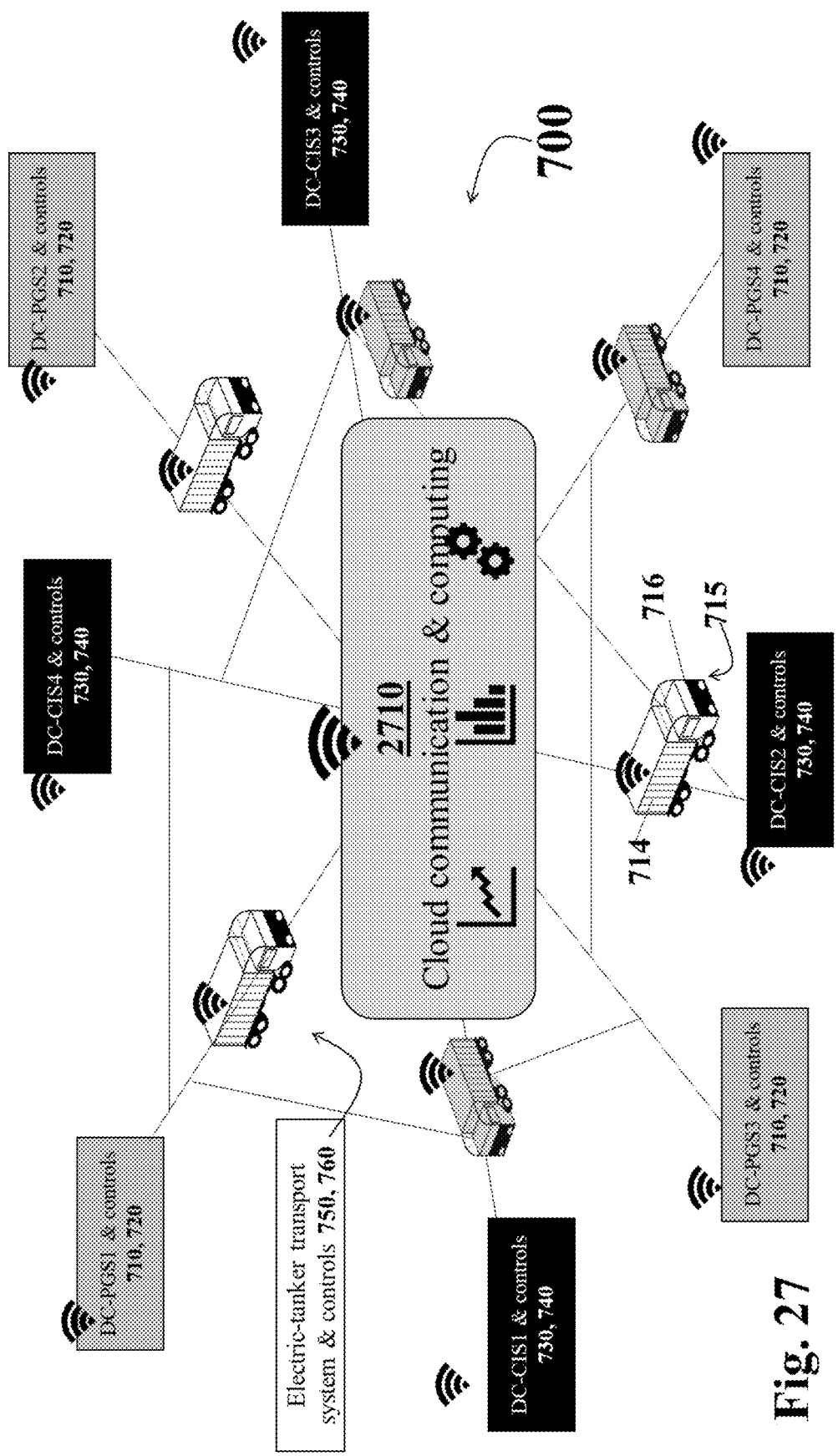
FIG. 27 illustrates system level analytics and controls for operation of a fleet of electric tanker transport system, BESDCSs, renewable DC power stations and DC charging stations, as an embodiment of disclosure.

FIG. 27 is a schematic view of controls system for the ZE-EVC system 700 that includes multiple DC-PGS systems 710, multiple DC-CIS systems 730 and a fleet of electric tankers 715 as a part of electric-tanker transport system 750. At any given time, multiple BESDCS 714 and electric tankers 715 may exist performing EV charging at DC-CIS 730 and/or performing charging from solar array 711 (as an example) at DC-PGS 710. The BESDCS 714 electric tanker 715 are not shown in FIG. 27.

A central control system 2710 is configured to be coupled to the controls system 720 of DG-PGS 710, controls system 740 of DC-CIS 730 and controls system 760 of electric tanker transport system 750 including the controls system 717 of each BESDCS 714 and electric truck 716. The controls system 2710, 720, 740, 760, 717 are coupled with wired or wireless communication system well known in the art. The controls system facilitate communication among each other (according to well-known methods in the art) to perform the following key steps to operate the ZE-EVC system 700: 1) Based on the capacity of each DC-CIS 730 to host number of EVs, electric energy demand over a period of time is measured by controls system 740 and communicated to the controls system 2710, 2) Based on generation capacity of each DC-PGS 710, electric energy supply capability is measured by controls system 720 and communicated to the controls system 2710, and 3) Location of each of the electric tanker 715 and amount of stored energy (state of charge) of the battery energy storage racks 1505 inside the BESDCS 714 are measured by the controls system 717 and 760 and communicated to the controls system 2710

Based on the electric energy demand and supply over a period of time, the controls system 2710 dispatches the electric tankers 715 with charged BESDCS 714 at the DC-PGS 710 for charging EVs at the DC-CIS 730. The controls system 2710 also dispatches the electric tankers 715 with substantially discharged BESDCS 714 at the DC-CIS 730 to the DC-PGS 710 for charging from Solar array 711. The controls system 2710 also dispatches the electric tankers 715 that are in transit to either DC-CIS 730 or to DC-PGS 710 to perform the balance of supply and demand of electric energy. This energy supply and demand is continuously balanced in a ZE-EVC system 700. Overall, over a period of time, the energy demanded at multiple DC-CIS 730 plus the energy consumed by electric truck 716 of the electric tanker transport system 750 during the transport operation of BESDCS 714 is matched by the amount of energy stored in each BESDCS 714 at the multiple DC-PGS 710

Further explanation of the measurement process is provided. For example, the energy demand at DC-CIS 730 is measured based on historical data that provides insight of how many EVs are likely to be charge at a given DC-CIS 730. Based on the historical data and transport traffic conditions, among many other variables, a predictive analysis at the DC-CIS 730 can be performed to compute the expected energy demand and communicated to the controls system 2710

Likewise, based on the historical weather data of DC-PGS 710, generation capacity of solar arrays can be determined, a method which is well known in the art. Predictive analysis can be performed using the weather data to estimate energy generation capacity in advance.

Likewise, based on the transport traffic condition and the location of electric tankers 715 and state of charge of energy of BESDCS 714 of each electric tanker 715, set of electric tankers 715 can be dispatched to respective DC-CIS 730 so that energy lost in the transport of BESDCS 714 is reduced and then BESDCS 714 can be subsequently dispatched to selected DC-PGS 710 so that overall energy lost in the transport of a given BESDCS 714 from a location to DC-CIS 730 and then to DC-PGS 710 is also reduced.

The above operation is just one of many examples of optimization of the operation of the ZE-EVC system 700. Without departing from the spirit of the controls system concepts described above, many other configuration and modes are possible such as instead of using a central controls system 2710 that receives information from all controls systems of DC-PGS 710, DC-CIS 730 and electric tanker transport system 750, a peer to peer communication based on distributed controls communication architecture is also possible. The main idea above is that measurement of energy demand at DC-CIS 730, energy supply at DC-PGS 710 and energy stored in the fleet of electric-tanker transport system 750 are performed and electric tankers 715 are dispatched to the DC-CIS 730 to meet the energy demand while reducing overall lost energy in the electric tanker transport system 750.

FIG. 27 also further illustrate operation of the controls system 2710 with cloud communication and computation capability enabled by technologies well known in the art. A number of electric tankers 715 with electric truck 716 with BESDCS 714, a number of DC-PGS 710 and a number of DC-CIS 730 exist in a ZE-EVC system 700. The cloud computation system, well known in the art, receives the following data according to pre-defined refresh rates:
1) State of charge of battery racks 1505 inside BESDCS 714 along with location of electric tankers 715 for logistic management on the road
2) Cost of energy supply (for example as $/kWh) broadcasted by DC-PGS systems 710
3) Demand of energy and associated pricing broadcasted by DC-CIS systems 730

The locations of DC-PGS systems 710 and DC-CSI 730 are registered along with the locations of electric tankers 715 in real time (based on a predetermined refresh rate) in the cloud; Based on the above primary data, economic optimization is performed and DC-PGS systems 710 and DC-CSI system 730 are paired with electric tankers 715 that leads to the following as an example:
1) Lowest cost of energy ($/kWh) at DC-CIS 730 for charging EVs
2) Fastest round-trip (between the identified and paired DC-PGS 710 and DC-CIS 730) for electric trucks with BESDCS 714, leading to reducing energy lost in the transport Without any limitation, other 2nd and 3rd order of optimization can be performed such as DG-PGS 710 can compete in the real-time market to supply energy to DC-CIS 730 using the electric tankers 715 and the overall electric tanker transport system 750. Based on the transport traffic conditions for example, each of the electric tankers 715 can compete to deliver energy at DG-CIS 730. Likewise, electric tankers 715 can compete to receive the power from DG-PGS 710 at a lowest price depending on the real time traffic and price broadcasted by DG-PGS 730. The block diagram shown in FIG. 27 (including the details of communication interface and standards) and the methods described above are not meant to include all conventional features and possibilities known by those of ordinary skill in the art to be required for the practice of the disclosure.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

While various embodiments of the disclosure have been described and illustrated, it is apparent that many modifications can be made without departing from the spirit and scope of disclosure. Accordingly, the illustrations, numerical values etc. used are merely examples and not limiting of the disclosure in any respect.

This written description uses examples to illustrate specific aspects of the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for charging at least one electric vehicle (EV), said system comprising:
   at least one transportable battery-energy-storage DC system (BESDCS);
   at least one renewable direct-current (DC) power supply station at a first location, wherein said renewable DC power supply station is:
   substantially stationary; and
   substantially dedicated for charging the at least one BESDCS, said at least one BESDCS comprising:
      at least one battery;
      at least one battery energy storage rack configured to receive said at least one battery; and
      at least one power electronics system;
   said at least one renewable DC power supply station comprising:
      at least one wind turbine, said at least one wind turbine configured to generate DC output power; and
      at least one DC/DC converter configured to be coupled to said at least one BESDCS and said at least one wind turbine, wherein said at least one DC/DC converter is further configured to charge said at least one BESDCS from said at least one DC wind turbine;
   a civil infrastructure comprising at least one substantially stationary DC charging station installed at a second location for charging of the at least one EV at said second location, said second location being different from said first location, the DC charging station not being coupled to an AC power grid; and
   at least one electric tanker transport comprising at least one electric truck vehicle configured to be coupled to said at least one BESDCS, wherein said at least one electric tanker transport is configured to:
      transport said at least one BESDCS from said first location to said second location; and
      transport said at least one BESDCS from said second location to said first location.

2. The system in accordance with claim 1, said at least one renewable DC power supply station comprising:
   at least one solar array; and
   at least one additional DC/DC converter configured to be coupled to said at least one BESDCS and said at least one solar array, wherein said additional DC/DC converter is configured to charge said at least one BESDCS from said at least one solar array.

3. A method of using the system of claim 1, said method comprising:
   measuring an energy demand over a pre-defined period at the at least one DC charging station;
   measuring an energy supply over a pre-defined period at the at least one renewable DC power supply station;
   determining the location of the at least one electric tanker transport;
   measuring the state of charge of the at least one battery;
   facilitating communication among:
      the at least one BESDCS;
      the at least one renewable DC power supply station;
      the at least one DC charging station; and
      the at least one electric tanker transport; and
   performing predictive analytics and logistics evaluations to facilitate substantially meeting power demand at the at least one DC charging station for charging of the EV by the power supplied from the at least one BESDCS.

4. The method of claim 3, wherein the at least one renewable DC power supply station, the at least one DC charging station, the at least one BESDCS, and the at least one electric tanker transport are configured to be coupled to at least one cloud communication and computing platform for EV charging, said method further comprising:
providing the following data according to a pre-defined refresh rate to the at least one cloud communication and computing platform:
a state of charge of the at least one battery;
a location of the at least one electric tanker transport;
a cost of energy supply broadcasted by the at least one renewable DC power supply station; and
a magnitude of energy demand and associated pricing broadcasted by the at least one said DC charging station; and
performing economic evaluations in the at least one cloud communication and computing platform comprising:
evaluating a lowering of the cost of delivered energy at the at least one DC charging station; and
evaluating energy consumption by the at least one electric tanker transport.

5. A system for charging at least one electric vehicle (EV), said system comprising:
at least one transportable battery-energy-storage DC system (BESDCS);
at least one renewable direct-current (DC) power supply station at a first location; and
a civil infrastructure comprising at least one substantially stationary DC charging station installed at a second location and substantially dedicated for charging of the at least one EV at said second location, said second location being different from said first location, wherein said DC charging station is configured to receive substantially all power for charging the at least one EV from said at least one BESDCS, said at least one BESDCS comprising at least one battery, said at least one power electronics system configured to be coupled to the at least one EV, the DC charging station not being coupled to an AC power grid; and
at least one electric tanker transport comprising at least one electric truck vehicle configured to be coupled to said at least one BESDCS, wherein said at least one electric tanker transport is configured to:
transport said at least one BESDCS from said first location to said second location for charging of the at least one EV; and
transport said at least one BESDCS from said second location to said first location;
wherein the system is configured to:
charge the at least one EV from the at least one BESDCS;
allocate sufficient energy in the at least one BESDCS for towing the at least one BESDCS to the at least one renewable DC power supply station via the at least one electric tanker transport;
measure an energy demand over a pre-defined period at the at least one DC charging station;
measure an energy supply over a pre-defined period at the at least one renewable DC power supply station;
determine the location of the at least one electric tanker transport;
measure a state of charge of the at least one battery;
facilitate communication among:
the at least one BESDCS;
the at least one renewable DC power supply station;
the at least one DC charging station; and
the at least one electric tanker transport; and
perform predictive analytics and logistics evaluations to facilitate substantially meeting power demand at the at least one DC charging station for charging of the EV by the power supplied from the at least one BESDCS.

6. The system in accordance with claim 5, wherein said at least one DC charging station comprises:
at least one EV coupling interface; and
at least one additional DC/DC converter configured to be coupled to said at least one BESDCS and said at least one EV coupling interface, wherein said additional DC/DC converter is further configured to charge the at least one EV through said EV coupling interface from said at least one BESDCS.

7. The system in accordance with claim 5, wherein said at least one DC charging station comprises:
at least one alternate power source; and
at least one power conversion system configured to be coupled to said at least one BESDCS and said at least alternate power source, wherein said power conversion system is configured to at least partially charge said at least one BESDCS for towing said at least one BESDCS to said at least one renewable DC power supply station via said at least one electric tanker transport.

8. The method of claim 5, wherein the at least one renewable DC power supply station, the at least one DC charging station, the at least one BESDCS, and the at least one electric tanker transport are configured to be coupled to at least one cloud communication and computing platform for EV charging, said method further comprising:
providing at least the following data according to a pre-defined refresh rate to the at least one cloud communication and computing platform:
a state of charge of the at least one battery;
a location of the at least one electric tanker transport;
a cost of energy supply broadcasted by the at least one renewable DC power supply station; and
a magnitude of energy demand and associated pricing broadcasted by the at least one DC charging station; and
performing economic evaluations in the at least one cloud communication and computing platform comprising:
evaluating a lowering of the cost of delivered energy at the at least one DC charging station; and
evaluating energy consumption by the at least one electric tanker transport.

9. A system for charging at least one electric vehicle (EV), said system comprising:
at least one transportable battery-energy-storage DC system (BESDCS);
at least one renewable direct-current (DC) power supply station at a first location, wherein said renewable DC power supply station is:
substantially stationary; and
substantially dedicated for generating DC power for charging movable battery energy storage system;
a civil infrastructure comprising at least one substantially stationary DC charging station installed at a second location for charging of the at least one EV at said second location, said second location being different from said first location, the DC charging station not being coupled to an AC power grid; and
at least one electric tanker transport comprising:
at least one electric truck vehicle comprising an electric drive train, said at least one electric truck vehicle configured to be coupled to said at least one BESDCS, said at least one BESDCS comprising:
at least one battery;

at least one battery rack configured to receive said at least one battery; and at least one power electronics system, wherein, said at least one power electronics system configured to:

charge said at least one battery from said at least one renewable DC power supply station; and charge the at least one EV from said at least one battery at said at least one DC charging station; and provide power to said electric drive train of said at least one electric truck vehicle, wherein said at least one electric tanker transport is configured to:

transport said at least one BESDCS from said first location to said second location for charging of the EV; and transport said at least one BESDCS from said second location to said first location;

wherein the system is configured to:

measure an energy demand over a pre-defined period at the at least one DC charging station;

measure an energy supply over a pre-defined period at the at least one renewable DC power supply station;

determine the location of the at least one electric tanker transport;

measure the state of charge of the at least one battery;

facilitate communication among:
the at least one BESDCS;
the at least one renewable DC power supply station;
the at least one DC charging station; and
the at least one electric tanker transport; and perform predictive analytics and logistics evaluations to facilitate substantially meeting power demand at the at least one DC charging station for charging of the at least one EV by the power supplied from the at least one BESDCS.

10. The system in accordance with claim 9, wherein said at least one electric tanker transport further comprises at least one auxiliary battery pack, said at least one auxiliary battery pack:

coupled to said electric drive train and configured to supply power to said electric drive train when said at least one BESDCS is not coupled to said at least one electric truck vehicle; and coupled to said at least one BESDCS to provide power to the electric drive train when said at least one BESDCS is coupled to said at least one electric truck vehicle.

11. The method of claim 9, wherein the at least one renewable DC power supply station, the at least one DC charging station, the at least one BESDCS, and the at least one electric tanker transport are configured to be coupled to at least one cloud communication and computing platform for EV charging, said method further comprising:

providing the following data according to a pre-defined refresh rate to the at least one cloud communication and computing platform:
a state of charge of the at least one battery;
a location of the at least one electric tanker transport;
a cost of energy supply broadcasted by the at least one renewable DC power supply station; and
a magnitude of energy demand and associated pricing broadcasted by the at least one DC charging station; and performing economic evaluations in the at least one cloud communication and computing platform comprising:

evaluating a lowering of the cost of delivered energy at the at least one DC charging station; and
evaluating energy consumption by the at least one electric tanker transport.

12. A movable system for charging at least one electric vehicle (EV), said system comprising:

at least one electric tanker transport comprising:
at least one electric truck vehicle comprising an electric drive train; and
at least one battery energy storage direct-current (DC) system (BESDCS), said at least one said electric truck vehicle configured to be coupled to said at least one BESDCS, said at least one BESDCS comprising:
at least one battery; and
at least one power electronics system, wherein, said at least one power electronics system configured to:

charge said at least one battery from at least one DC power supply; and charge the at least one EV from said at least one battery; and provide power to said electric drive train of said at least one electric truck vehicle; and a coupling element for providing cooling to said plurality of battery racks and said power electronics system, wherein said at least one electric tanker transport is configured to:

transport said at least one BESDCS from a first location to a second location for charging of the at least one EV; and transport said at least one BESDCS from said second location to said first location for charging said at least one battery from the at least one DC power supply; and wherein the system is configured to:

measure an energy demand over a pre-defined period at at least one DC charging station;

measure an energy supply over a pre-defined period at at least one renewable DC power supply station;

determine the location of the at least one electric tanker transport;

measure the state of charge of the at least one battery;

facilitating communication among:
the at least one BESDCS;
the at least one renewable DC power supply station;
the at least one DC charging station; and
the at least one electric tanker transport; and perform predictive analytics and logistics evaluations to facilitate substantially meeting power demand at the at least one DC charging station for charging of the at least one EV by the power supplied from the at least one BESDCS.

13. The system in accordance with claim 12, wherein said at least one BESDCS is removably coupled to said at least one electric truck vehicle, said at least one BESDCS further configured to be temporarily removed from said at least one electric truck vehicle and coupled to at least one of:

said at least one renewable DC power supply station at said first location; and said at least one DC charging station for charging of the at least one EV at said second location.

14. The system in accordance with claim 12, wherein said at least one electric truck vehicle further comprises at least one auxiliary battery pack, said at least one auxiliary battery pack:
- coupled to said electric drive train and configured to supply power to said electric drive train when said at least one BESDCS is not capable to provide power to said at least one electric truck vehicle; and
- coupled to said at least one BESDCS to provide power to the electric drive train when said at least one BESDCS is coupled to said at least one electric truck vehicle.

15. The system in accordance with claim 12, said system further comprising at least control system:
- coupled to said at least one electric tanker transport and configured to receive command for charging the at least one EV;
- coupled to said at least one electric tanker transport and configured to receive command for charging from the at least one DC power supply; and
- coupled to at least one cloud communication and computing platform.

16. A method comprising:
providing a system for charging at least one electric vehicle (EV), the system comprising:
- at least one transportable battery-energy-storage DC system (BESDCS);
- at least one renewable direct-current (DC) power supply station at a first location;
- at least one DC charging station for charging of the at least one EV at a second location different from said first location; and
- at least one electric tanker transport comprising at least one electric truck vehicle configured to be coupled to said at least one BESDCS, wherein said at least one electric tanker transport is configured to:
  - transport said at least one BESDCS from said first location to said second location; and
  - transport said at least one BESDCS from said second location to said first location;
measuring an energy demand over a pre-defined period at the at least one DC charging station;
measuring an energy supply over a pre-defined period at the at least one renewable DC power supply station;
determining the location of the at least one electric tanker transport;
measuring the state of charge of at least one battery of the at least one BESDCS;
facilitating communication among:
- the at least one BESDCS;
- the at least one renewable DC power supply station;
- the at least one DC charging station; and
- the at least one electric tanker transport; and
performing predictive analytics and logistics evaluations to facilitate substantially meeting power demand at the at least one DC charging station for charging of the EV by the power supplied from the at least one BESDCS.

17. A method comprising:
providing a system for charging at least one electric vehicle (EV), the system comprising:
- at least one transportable battery-energy-storage DC system (BESDCS);
- at least one renewable direct-current (DC) power supply station at a first location; and
- at least one DC charging station substantially dedicated for charging of the at least one EV at a second location different from said first location, wherein said DC charging station is configured to receive substantially all power for charging the at least one EV from said at least one BESDCS, said at least one BESDCS comprising at least one battery, said at least one power electronics system configured to be coupled to the at least one EV; and
- at least one electric tanker transport comprising at least one electric truck vehicle configured to be coupled to said at least one BESDCS, wherein said at least one electric tanker transport is configured to:
  - transport said at least one BESDCS from said first location to said second location for charging of the at least one EV; and
  - transport said at least one BESDCS from said second location to said first location;
charging the at least one EV from the at least one BESDCS;
allocating sufficient energy in the at least one BESDCS for towing the at least one BESDCS to the at least one renewable DC power supply station via the at least one electric tanker transport;
measuring an energy demand over a pre-defined period at the at least one DC charging station;
measuring an energy supply over a pre-defined period at the at least one renewable DC power supply station;
determining the location of the at least one electric tanker transport;
measuring a state of charge of at least one battery of the BESDCS;
facilitating communication among:
- the at least one BESDCS;
- the at least one renewable DC power supply station;
- the at least one DC charging station; and
- the at least one electric tanker transport; and
performing predictive analytics and logistics evaluations to facilitate substantially meeting power demand at the at least one DC charging station for charging of the EV by the power supplied from the at least one BESDCS.

18. A method comprising:
providing a system for charging at least one electric vehicle (EV), the system comprising:
- at least one transportable battery-energy-storage DC system (BESDCS);
- at least one renewable direct-current (DC) power supply station at a first location; and
- at least one DC charging station substantially dedicated for charging of the at least one EV at a second location different from said first location, wherein said DC charging station is configured to receive substantially all power for charging the at least one EV from said at least one BESDCS, said at least one BESDCS comprising at least one battery, said at least one power electronics system configured to be coupled to the at least one EV; and
- at least one electric tanker transport comprising at least one electric truck vehicle configured to be coupled to said at least one BESDCS, wherein said at least one electric tanker transport is configured to:
  - transport said at least one BESDCS from said first location to said second location for charging of the at least one EV; and
  - transport said at least one BESDCS from said second location to said first location;
charging the at least one EV from the at least one BESDCS;
allocating sufficient energy in the at least one BESDCS for towing the at least one BESDCS to the at least one renewable DC power supply station via the at least one electric tanker transport, wherein the at least one renewable DC power supply station, the at least one DC charging station, the at least one BESDCS, and the at least one electric tanker transport are configured to be coupled to at least one cloud communication and computing platform for EV charging, said method further comprising:
  providing at least the following data according to a pre-defined refresh rate to the at least one cloud communication and computing platform:
    a state of charge of the at least one battery;
    a location of the at least one electric tanker transport;
    a cost of energy supply broadcasted by the at least one renewable DC power supply station; and
    a magnitude of energy demand and associated pricing broadcasted by the at least one DC charging station; and
  performing economic evaluations in the at least one cloud communication and computing platform comprising:
    evaluating a lowering of the cost of delivered energy at the at least one DC charging station; and
    evaluating energy consumption by the at least one electric tanker transport.

19. A method comprising:
providing a system for charging at least one electric vehicle (EV), the system comprising:
  at least one transportable battery-energy-storage DC system (BESDCS);
  at least one renewable direct-current (DC) power supply station at a first location;
  at least one DC charging station for charging of the at least one EV at a second location different from said first location; and
  at least one electric tanker transport comprising:
    at least one electric truck vehicle comprising an electric drive train, said at least one electric truck vehicle configured to be coupled to said at least one BESDCS, said at least one BESDCS comprising:
      at least one battery;
      at least one battery rack configured to receive said at least one battery; and
      at least one power electronics system, wherein, said at least one power electronics system configured to:
        charge said at least one battery from said at least one renewable DC power supply station; and
        charge the at least one EV from said at least one battery at said at least one DC charging station; and
        provide power to said electric drive train of said at least one electric truck vehicle, wherein said at least one electric tanker transport is configured to:
          transport said at least one BESDCS from said first location to said second location for charging of the EV; and
          transport said at least one BESDCS from said second location to said first location;
measuring an energy demand over a pre-defined period at the at least one DC charging station;
measuring an energy supply over a pre-defined period at the at least one renewable DC power supply station;
determining the location of the at least one electric tanker transport;
measuring the state of charge of the at least one battery;
facilitating communication among:
  the at least one BESDCS;
  the at least one renewable DC power supply station;
  the at least one DC charging station; and
  the at least one electric tanker transport; and
performing predictive analytics and logistics evaluations to facilitate substantially meeting power demand at the at least one DC charging station for charging of the at least one EV by the power supplied from the at least one BESDCS.

20. A system for charging at least one electric vehicle (EV), said system comprising:
  at least one transportable battery-energy-storage DC system (BESDCS);
  at least one renewable direct-current (DC) power supply station at a first location, wherein said renewable DC power supply station is:
    substantially stationary; and
    substantially dedicated for charging the at least one BESDCS, said at least one BESDCS comprising:
      at least one battery;
      at least one battery energy storage rack configured to receive said at least one battery; and
      at least one power electronics system;
  a civil infrastructure comprising at least one substantially stationary DC charging station installed at a second location for charging of the at least one EV at said second location, said second location being different from said first location, the DC charging station not being coupled to an AC power grid; and
  at least one electric tanker transport comprising at least one electric truck vehicle configured to be coupled to said at least one BESDCS, wherein said at least one electric tanker transport is configured to:
    transport said at least one BESDCS from said first location to said second location; and
    transport said at least one BESDCS from said second location to said first location;
  wherein the system is configured to:
    measure an energy demand over a pre-defined period at the at least one DC charging station;
    measure an energy supply over a pre-defined period at the at least one renewable DC power supply station;
    determine the location of the at least one electric tanker transport;
    measure the state of charge of the at least one battery;
    facilitate communication among:
      the at least one BESDCS;
      the at least one renewable DC power supply station;
      the at least one DC charging station; and
      the at least one electric tanker transport; and
    perform predictive analytics and logistics evaluations to facilitate substantially meeting power demand at the at least one DC charging station for charging of the EV by the power supplied from the at least one BESDCS.

21. A system for charging at least one electric vehicle (EV), said system comprising:
  at least one transportable battery-energy-storage DC system (BESDCS);
  at least one renewable direct-current (DC) power supply station at a first location; and
  a civil infrastructure comprising at least one substantially stationary DC charging station installed at a second location and substantially dedicated for charging of the at least one EV at said second location, said second location being different from said first location, wherein said DC charging station is configured to receive substantially all power for charging the at least one EV from said at least one BESDCS, said at least one BESDCS comprising at least one battery, said at least one power electronics system configured to be coupled to the at least one EV, the DC charging station not being coupled to an AC power grid; and at least one electric tanker transport comprising at least one electric truck vehicle configured to be coupled to said at least one BESDCS, wherein said at least one electric tanker transport is configured to:
  transport said at least one BESDCS from said first location to said second location for charging of the at least one EV; and
  transport said at least one BESDCS from said second location to said first location;

wherein the system is configured to:
  charge the at least one EV from the at least one BESDCS;
  allocate sufficient energy in the at least one BESDCS for towing the at least one BESDCS to the at least one renewable DC power supply station via the at least one electric tanker transport; and
  wherein the at least one renewable DC power supply station, the at least one DC charging station, the at least one BESDCS, and the at least one electric tanker transport are configured to be coupled to at least one cloud communication and computing platform for EV charging, wherein the system is further configured to:
    provide at least the following data according to a pre-defined refresh rate to the at least one cloud communication and computing platform:
      a state of charge of the at least one battery;
      a location of the at least one electric tanker transport;
      a cost of energy supply broadcasted by the at least one renewable DC power supply station; and
      a magnitude of energy demand and associated pricing broadcasted by the at least one DC charging station; and
    perform economic evaluations in the at least one cloud communication and computing platform comprising:
  evaluate a lowering of the cost of delivered energy at the at least one DC charging station; and
  evaluate energy consumption by the at least one electric tanker transport.

* * * * *